United States Patent
Song

(10) Patent No.: US 8,553,768 B2
(45) Date of Patent: Oct. 8, 2013

(54) IMAGE ENCODING/DECODING METHOD AND APPARATUS

(75) Inventor: Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1892 days.

(21) Appl. No.: 11/785,832

(22) Filed: Apr. 20, 2007

(65) Prior Publication Data

US 2008/0008238 A1  Jan. 10, 2008

(30) Foreign Application Priority Data

Jul. 4, 2006 (KR) .................. 10-2006-0062440

(51) Int. Cl.
  *H04N 7/12* (2006.01)
  *H04N 11/02* (2006.01)
  *H04N 11/04* (2006.01)
  *G06K 9/36* (2006.01)

(52) U.S. Cl.
  USPC .............. 375/240.12; 382/232; 382/238

(58) Field of Classification Search
  USPC .................................. 375/240.12–240.2
  See application file for complete search history.

(56) References Cited

U.S. PATENT DOCUMENTS

| | | | |
|---|---|---|---|
| 5,513,128 A | 4/1996 | Rao | |
| 5,544,263 A * | 8/1996 | Iwamura | 382/166 |
| 6,785,425 B1 | 8/2004 | Feder et al. | |
| 6,829,301 B1 * | 12/2004 | Tinker et al. | 375/240.12 |
| 7,023,918 B2 * | 4/2006 | Yu et al. | 375/240.12 |
| 7,215,709 B2 * | 5/2007 | Yamaguchi et al. | 375/240.21 |
| 7,362,809 B2 * | 4/2008 | Booth et al. | 375/240.16 |
| 7,702,016 B2 * | 4/2010 | Winder et al. | 375/240.12 |
| 2004/0258162 A1 * | 12/2004 | Gordon et al. | 375/240.25 |
| 2005/0237433 A1 * | 10/2005 | Van Dijk et al. | 348/702 |
| 2005/0259730 A1 * | 11/2005 | Sun | 375/240.03 |
| 2005/0281473 A1 | 12/2005 | Kim et al. | |
| 2008/0253456 A1 | 10/2008 | Yin et al. | |

FOREIGN PATENT DOCUMENTS

| | | |
|---|---|---|
| EP | 1478189 A2 | 11/2004 |
| JP | 2002-335407 A | 11/2002 |
| JP | 2003-116141 A | 4/2003 |
| JP | 2004343774 A | 12/2004 |
| JP | 2005-184525 A | 7/2005 |
| KR | 10-2006-0006183 A | 1/2006 |
| WO | 2006033953 A1 | 3/2006 |

OTHER PUBLICATIONS

Communication dated Jan. 17, 2012 issued by the Japanese Patent Office in counterpart Japanese Patent Application No. 2008-544268.

(Continued)

*Primary Examiner* — Saleh Najjar
*Assistant Examiner* — Feliciano Mejia
(74) *Attorney, Agent, or Firm* — Sughrue Mion, PLLC

(57) ABSTRACT

An image encoding/decoding method and apparatus, in which at least one of a plurality of color component images except a first color component image is predicted from motion estimation information or a reconstructed color component image of the first color component images using correlation among the plurality of color component images. The image encoding method includes performing predictive-encoding on the first color component image among the plurality of color component images forming a single image using a general encoding method, and performing motion estimation and compensation on the at least one of the other color component images or predicting the at least one of the other color component images using a reconstructed first color component image.

52 Claims, 12 Drawing Sheets

(56) References Cited

OTHER PUBLICATIONS

International Search Report for Int'l. Application No. PCT/KR2007/002713, dated Aug. 29, 2007.

"Joint 4:4:4 Video Model (JFVM) 2." ITU Study Group 16—Video Coding Experts Group—ISO/IEC MPEG & ITU-T VCEG(ISO/IECJTC1/SC29/WG11 and ITU-T SG16 Q6), No. N7793, Mar. 19, 2006.

Benierbah et al. "Compression of Colour Images by Inter-band Compensated Prediction." IEEE Proceedings: Vision, Image and Signal Processing, Inst. of Electrical Engineers, Great Britain, vol. 153, No. 2, pp. 237-243, Apr. 6, 2006.

Carotti et al. "Motion-compensated Lossless Video Coding in the Calic Framework." IEEE International Symposium on Signal Processing and Information Technology, pp. 600-605, Dec. 18-21, 2005.

Extended European Search Report dated Sep. 2, 2011 from the European Patent Office in counterpart application No. 07807929.0.

Goffman-Vinopal et al. "Color Image Compression Using Inter-Color Correlation." International Conference on Image Processing, vol. 2, pp. 353-356, Sep. 22, 2002.

Kim et al. "Inter-plane Prediction for RGB Video Coding." IEEE International Conference on Image Processing, vol. 2, pp. 785-788, Oct. 24, 2004.

Memon et al. "An Interband Coding Extension of the New Lossless JPEG Standard." Medical and Biological Engineering, vol. 3024, pt. 1 of 2, pp. 47-58, Feb. 12, 1997.

Memon et al. "Lossless Compression of Video Sequences." IEEE Transactions on Communications, vol. 44, No. 10, pp. 1340-1345, Oct. 1, 1996.

Penrose. "Extending Lossless Image Compression." Technical Report No. 526, pp. 1-137, Jan. 1, 2001, http://www.cl.cam.ac.uk/techreports/UCAM-CL-TR-526.pdf.

Rao et al. "Multispectral Data Compression Using Bidirectional Interband Prediction." IEEE Transactions on Geoscience and Remote Sensing, vol. 34, No. 2, pp. 385-397, Mar. 1, 1996.

Rizzo et al. "Low-Complexity Lossless Compression of Hyperspectral Imagery via Linear Prediction." IEEE Signal Processing Letters, vol. 12, No. 2, pp. 138-141, Feb. 1, 2005.

Spring et al. "Experiments in the Lossless Compression of Time Series Satellite Images Using Multispectral Image Compression Techniques." Thirty-First Asilomar Conference on Signals, Systems & Computers, vol. 2, pp. 1437-1441, Nov. 2-5, 1997.

Communication dated Sep. 4, 2012 from the Japanese Patent Office in counterpart Japanese application No. 2008-544268.

Kim et al., "Study on Advanced 4:4:4 Coding", JVT of ISO/IEC MPEG & ITU-T VCEG (ISO/IEC JTC1/SC29/WG11 and ITU-T SG16 Q.6), 16th Meeting, Poznan, PL, Jul. 24-29, 2005, 9 pages total.

Communication dated Jun. 14, 2013 issued by the Korean Intellectual Property Office in counterpart Korean Patent Application No. 10-2006-0062440.

\* cited by examiner

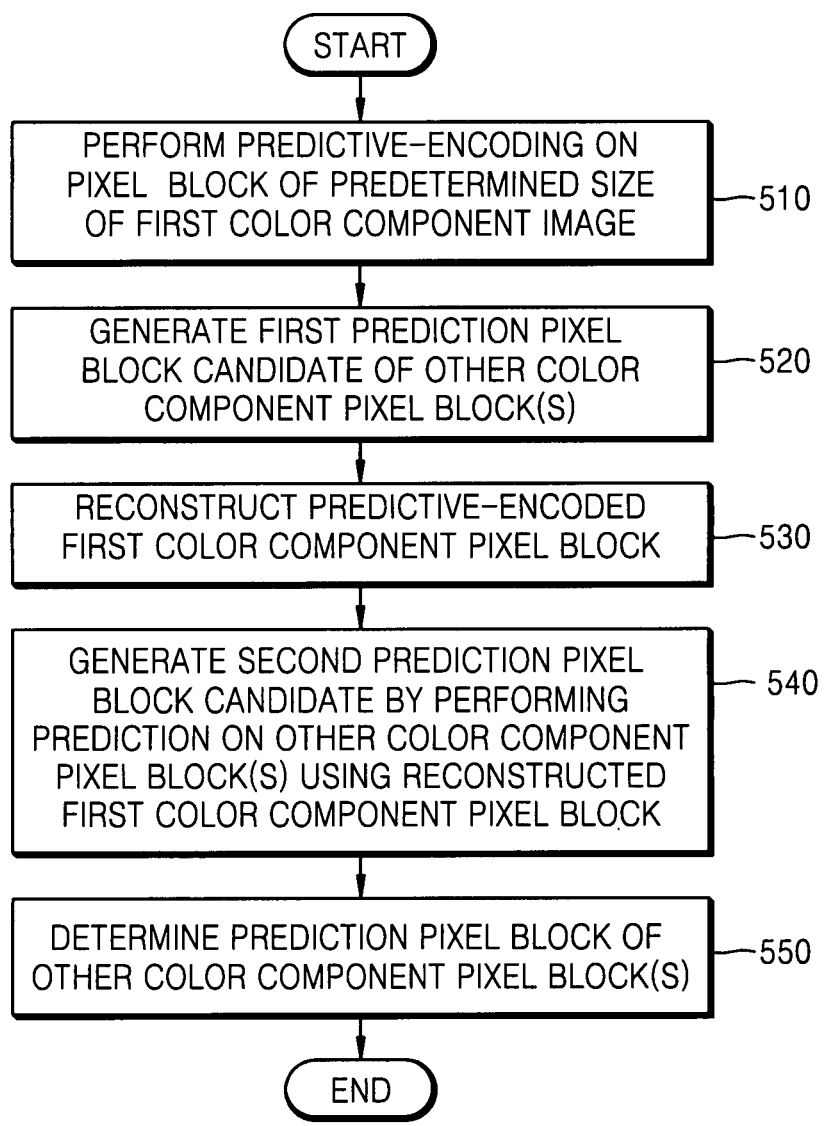

FIG. 7A

| $g_{-1,-1}$ | $g_{-1,0}$ | $g_{-1,1}$ | $g_{-1,2}$ | $g_{-1,3}$ | $g_{-1,4}$ | $g_{-1,5}$ | $g_{-1,6}$ | $g_{-1,7}$ | $g_{-1,8}$ | $g_{-1,9}$ | $g_{-1,10}$ | $g_{-1,11}$ | $g_{-1,12}$ | $g_{-1,13}$ | $g_{-1,14}$ | $g_{-1,15}$ |
|---|---|---|---|---|---|---|---|---|---|---|---|---|---|---|---|---|
| $g_{0,-1}$ | $g_{0,0}$ | $g_{0,1}$ | $g_{0,2}$ | $g_{0,3}$ | $g_{0,4}$ | $g_{0,5}$ | $g_{0,6}$ | $g_{0,7}$ | $g_{0,8}$ | $g_{0,9}$ | $g_{0,10}$ | $g_{0,11}$ | $g_{0,12}$ | $g_{0,13}$ | $g_{0,14}$ | $g_{0,15}$ |
| $g_{1,-1}$ | $g_{1,0}$ | $g_{1,1}$ | $g_{1,2}$ | $g_{1,3}$ | $g_{1,4}$ | $g_{1,5}$ | $g_{1,6}$ | $g_{1,7}$ | $g_{1,8}$ | $g_{1,9}$ | $g_{1,10}$ | $g_{1,11}$ | $g_{1,12}$ | $g_{1,13}$ | $g_{1,14}$ | $g_{1,15}$ |
| $g_{2,-1}$ | $g_{2,0}$ | $g_{2,1}$ | $g_{2,2}$ | $g_{2,3}$ | $g_{2,4}$ | $g_{2,5}$ | $g_{2,6}$ | $g_{2,7}$ | $g_{2,8}$ | $g_{2,9}$ | $g_{2,10}$ | $g_{2,11}$ | $g_{2,12}$ | $g_{2,13}$ | $g_{2,14}$ | $g_{2,15}$ |
| $g_{3,-1}$ | $g_{3,0}$ | $g_{3,1}$ | $g_{3,2}$ | $g_{3,3}$ | $g_{3,4}$ | $g_{3,5}$ | $g_{3,6}$ | $g_{3,7}$ | $g_{3,8}$ | $g_{3,9}$ | $g_{3,10}$ | $g_{3,11}$ | $g_{3,12}$ | $g_{3,13}$ | $g_{3,14}$ | $g_{3,15}$ |
| $g_{4,-1}$ | $g_{4,0}$ | $g_{4,1}$ | $g_{4,2}$ | $g_{4,3}$ | $g_{4,4}$ | $g_{4,5}$ | $g_{4,6}$ | $g_{4,7}$ | $g_{4,8}$ | $g_{4,9}$ | $g_{4,10}$ | $g_{4,11}$ | $g_{4,12}$ | $g_{4,13}$ | $g_{4,14}$ | $g_{4,15}$ |
| $g_{5,-1}$ | $g_{5,0}$ | $g_{5,1}$ | $g_{5,2}$ | $g_{5,3}$ | $g_{5,4}$ | $g_{5,5}$ | $g_{5,6}$ | $g_{5,7}$ | $g_{5,8}$ | $g_{5,9}$ | $g_{5,10}$ | $g_{5,11}$ | $g_{5,12}$ | $g_{5,13}$ | $g_{5,14}$ | $g_{5,15}$ |
| $g_{6,-1}$ | $g_{6,0}$ | $g_{6,1}$ | $g_{6,2}$ | $g_{6,3}$ | $g_{6,4}$ | $g_{6,5}$ | $g_{6,6}$ | $g_{6,7}$ | $g_{6,8}$ | $g_{6,9}$ | $g_{6,10}$ | $g_{6,11}$ | $g_{6,12}$ | $g_{6,13}$ | $g_{6,14}$ | $g_{6,15}$ |
| $g_{7,-1}$ | $g_{7,0}$ | $g_{7,1}$ | $g_{7,2}$ | $g_{7,3}$ | $g_{7,4}$ | $g_{7,5}$ | $g_{7,6}$ | $g_{7,7}$ | $g_{7,8}$ | $g_{7,9}$ | $g_{7,10}$ | $g_{7,11}$ | $g_{7,12}$ | $g_{7,13}$ | $g_{7,14}$ | $g_{7,15}$ |
| $g_{8,-1}$ | $g_{8,0}$ | $g_{8,1}$ | $g_{8,2}$ | $g_{8,3}$ | $g_{8,4}$ | $g_{8,5}$ | $g_{8,6}$ | $g_{8,7}$ | $g_{8,8}$ | $g_{8,9}$ | $g_{8,10}$ | $g_{8,11}$ | $g_{8,12}$ | $g_{8,13}$ | $g_{8,14}$ | $g_{8,15}$ |
| $g_{9,-1}$ | $g_{9,0}$ | $g_{9,1}$ | $g_{9,2}$ | $g_{9,3}$ | $g_{9,4}$ | $g_{9,5}$ | $g_{9,6}$ | $g_{9,7}$ | $g_{9,8}$ | $g_{9,9}$ | $g_{9,10}$ | $g_{9,11}$ | $g_{9,12}$ | $g_{9,13}$ | $g_{9,14}$ | $g_{9,15}$ |
| $g_{10,-1}$ | $g_{10,0}$ | $g_{10,1}$ | $g_{10,2}$ | $g_{10,3}$ | $g_{10,4}$ | $g_{10,5}$ | $g_{10,6}$ | $g_{10,7}$ | $g_{10,8}$ | $g_{10,9}$ | $g_{10,10}$ | $g_{10,11}$ | $g_{10,12}$ | $g_{10,13}$ | $g_{10,14}$ | $g_{10,15}$ |
| $g_{11,-1}$ | $g_{11,0}$ | $g_{11,1}$ | $g_{11,2}$ | $g_{11,3}$ | $g_{11,4}$ | $g_{11,5}$ | $g_{11,6}$ | $g_{11,7}$ | $g_{11,8}$ | $g_{11,9}$ | $g_{11,10}$ | $g_{11,11}$ | $g_{11,12}$ | $g_{11,13}$ | $g_{11,14}$ | $g_{11,15}$ |
| $g_{12,-1}$ | $g_{12,0}$ | $g_{12,1}$ | $g_{12,2}$ | $g_{12,3}$ | $g_{12,4}$ | $g_{12,5}$ | $g_{12,6}$ | $g_{12,7}$ | $g_{12,8}$ | $g_{12,9}$ | $g_{12,10}$ | $g_{12,11}$ | $g_{12,12}$ | $g_{12,13}$ | $g_{12,14}$ | $g_{12,15}$ |
| $g_{13,-1}$ | $g_{13,0}$ | $g_{13,1}$ | $g_{13,2}$ | $g_{13,3}$ | $g_{13,4}$ | $g_{13,5}$ | $g_{13,6}$ | $g_{13,7}$ | $g_{13,8}$ | $g_{13,9}$ | $g_{13,10}$ | $g_{13,11}$ | $g_{13,12}$ | $g_{13,13}$ | $g_{13,14}$ | $g_{13,15}$ |
| $g_{14,-1}$ | $g_{14,0}$ | $g_{14,1}$ | $g_{14,2}$ | $g_{14,3}$ | $g_{14,4}$ | $g_{14,5}$ | $g_{14,6}$ | $g_{14,7}$ | $g_{14,8}$ | $g_{14,9}$ | $g_{14,10}$ | $g_{14,11}$ | $g_{14,12}$ | $g_{14,13}$ | $g_{14,14}$ | $g_{14,15}$ |
| $g_{15,-1}$ | $g_{15,0}$ | $g_{15,1}$ | $g_{15,2}$ | $g_{15,3}$ | $g_{15,4}$ | $g_{15,5}$ | $g_{15,6}$ | $g_{15,7}$ | $g_{15,8}$ | $g_{15,9}$ | $g_{15,10}$ | $g_{15,11}$ | $g_{15,12}$ | $g_{15,13}$ | $g_{15,14}$ | $g_{15,15}$ |

FIG. 7B

| $b_{-1,-1}$ | $b_{-1,0}$ | $b_{-1,1}$ | $b_{-1,2}$ | $b_{-1,3}$ | $b_{-1,4}$ | $b_{-1,5}$ | $b_{-1,6}$ | $b_{-1,7}$ | $b_{-1,8}$ | $b_{-1,9}$ | $b_{-1,10}$ | $b_{-1,11}$ | $b_{-1,12}$ | $b_{-1,13}$ | $b_{-1,14}$ | $b_{-1,15}$ |
|---|---|---|---|---|---|---|---|---|---|---|---|---|---|---|---|---|
| $b_{0,-1}$ | $b_{0,0}$ | $b_{0,1}$ | $b_{0,2}$ | $b_{0,3}$ | $b_{0,4}$ | $b_{0,5}$ | $b_{0,6}$ | $b_{0,7}$ | $b_{0,8}$ | $b_{0,9}$ | $b_{0,10}$ | $b_{0,11}$ | $b_{0,12}$ | $b_{0,13}$ | $b_{0,14}$ | $b_{0,15}$ |
| $b_{1,-1}$ | $b_{1,0}$ | $b_{1,1}$ | $b_{1,2}$ | $b_{1,3}$ | $b_{1,4}$ | $b_{1,5}$ | $b_{1,6}$ | $b_{1,7}$ | $b_{1,8}$ | $b_{1,9}$ | $b_{1,10}$ | $b_{1,11}$ | $b_{1,12}$ | $b_{1,13}$ | $b_{1,14}$ | $b_{1,15}$ |
| $b_{2,-1}$ | $b_{2,0}$ | $b_{2,1}$ | $b_{2,2}$ | $b_{2,3}$ | $b_{2,4}$ | $b_{2,5}$ | $b_{2,6}$ | $b_{2,7}$ | $b_{2,8}$ | $b_{2,9}$ | $b_{2,10}$ | $b_{2,11}$ | $b_{2,12}$ | $b_{2,13}$ | $b_{2,14}$ | $b_{2,15}$ |
| $b_{3,-1}$ | $b_{3,0}$ | $b_{3,1}$ | $b_{3,2}$ | $b_{3,3}$ | $b_{3,4}$ | $b_{3,5}$ | $b_{3,6}$ | $b_{3,7}$ | $b_{3,8}$ | $b_{3,9}$ | $b_{3,10}$ | $b_{3,11}$ | $b_{3,12}$ | $b_{3,13}$ | $b_{3,14}$ | $b_{3,15}$ |
| $b_{4,-1}$ | $b_{4,0}$ | $b_{4,1}$ | $b_{4,2}$ | $b_{4,3}$ | $b_{4,4}$ | $b_{4,5}$ | $b_{4,6}$ | $b_{4,7}$ | $b_{4,8}$ | $b_{4,9}$ | $b_{4,10}$ | $b_{4,11}$ | $b_{4,12}$ | $b_{4,13}$ | $b_{4,14}$ | $b_{4,15}$ |
| $b_{5,-1}$ | $b_{5,0}$ | $b_{5,1}$ | $b_{5,2}$ | $b_{5,3}$ | $b_{5,4}$ | $b_{5,5}$ | $b_{5,6}$ | $b_{5,7}$ | $b_{5,8}$ | $b_{5,9}$ | $b_{5,10}$ | $b_{5,11}$ | $b_{5,12}$ | $b_{5,13}$ | $b_{5,14}$ | $b_{5,15}$ |
| $b_{6,-1}$ | $b_{6,0}$ | $b_{6,1}$ | $b_{6,2}$ | $b_{6,3}$ | $b_{6,4}$ | $b_{6,5}$ | $b_{6,6}$ | $b_{6,7}$ | $b_{6,8}$ | $b_{6,9}$ | $b_{6,10}$ | $b_{6,11}$ | $b_{6,12}$ | $b_{6,13}$ | $b_{6,14}$ | $b_{6,15}$ |
| $b_{7,-1}$ | $b_{7,0}$ | $b_{7,1}$ | $b_{7,2}$ | $b_{7,3}$ | $b_{7,4}$ | $b_{7,5}$ | $b_{7,6}$ | $b_{7,7}$ | $b_{7,8}$ | $b_{7,9}$ | $b_{7,10}$ | $b_{7,11}$ | $b_{7,12}$ | $b_{7,13}$ | $b_{7,14}$ | $b_{7,15}$ |
| $b_{8,-1}$ | $b_{8,0}$ | $b_{8,1}$ | $b_{8,2}$ | $b_{8,3}$ | $b_{8,4}$ | $b_{8,5}$ | $b_{8,6}$ | $b_{8,7}$ | $b_{8,8}$ | $b_{8,9}$ | $b_{8,10}$ | $b_{8,11}$ | $b_{8,12}$ | $b_{8,13}$ | $b_{8,14}$ | $b_{8,15}$ |
| $b_{9,-1}$ | $b_{9,0}$ | $b_{9,1}$ | $b_{9,2}$ | $b_{9,3}$ | $b_{9,4}$ | $b_{9,5}$ | $b_{9,6}$ | $b_{9,7}$ | $b_{9,8}$ | $b_{9,9}$ | $b_{9,10}$ | $b_{9,11}$ | $b_{9,12}$ | $b_{9,13}$ | $b_{9,14}$ | $b_{9,15}$ |
| $b_{10,-1}$ | $b_{10,0}$ | $b_{10,1}$ | $b_{10,2}$ | $b_{10,3}$ | $b_{10,4}$ | $b_{10,5}$ | $b_{10,6}$ | $b_{10,7}$ | $b_{10,8}$ | $b_{10,9}$ | $b_{10,10}$ | $b_{10,11}$ | $b_{10,12}$ | $b_{10,13}$ | $b_{10,14}$ | $b_{10,15}$ |
| $b_{11,-1}$ | $b_{11,0}$ | $b_{11,1}$ | $b_{11,2}$ | $b_{11,3}$ | $b_{11,4}$ | $b_{11,5}$ | $b_{11,6}$ | $b_{11,7}$ | $b_{11,8}$ | $b_{11,9}$ | $b_{11,10}$ | $b_{11,11}$ | $b_{11,12}$ | $b_{11,13}$ | $b_{11,14}$ | $b_{11,15}$ |
| $b_{12,-1}$ | $b_{12,0}$ | $b_{12,1}$ | $b_{12,2}$ | $b_{12,3}$ | $b_{12,4}$ | $b_{12,5}$ | $b_{12,6}$ | $b_{12,7}$ | $b_{12,8}$ | $b_{12,9}$ | $b_{12,10}$ | $b_{12,11}$ | $b_{12,12}$ | $b_{12,13}$ | $b_{12,14}$ | $b_{12,15}$ |
| $b_{13,-1}$ | $b_{13,0}$ | $b_{13,1}$ | $b_{13,2}$ | $b_{13,3}$ | $b_{13,4}$ | $b_{13,5}$ | $b_{13,6}$ | $b_{13,7}$ | $b_{13,8}$ | $b_{13,9}$ | $b_{13,10}$ | $b_{13,11}$ | $b_{13,12}$ | $b_{13,13}$ | $b_{13,14}$ | $b_{13,15}$ |
| $b_{14,-1}$ | $b_{14,0}$ | $b_{14,1}$ | $b_{14,2}$ | $b_{14,3}$ | $b_{14,4}$ | $b_{14,5}$ | $b_{14,6}$ | $b_{14,7}$ | $b_{14,8}$ | $b_{14,9}$ | $b_{14,10}$ | $b_{14,11}$ | $b_{14,12}$ | $b_{14,13}$ | $b_{14,14}$ | $b_{14,15}$ |
| $b_{15,-1}$ | $b_{15,0}$ | $b_{15,1}$ | $b_{15,2}$ | $b_{15,3}$ | $b_{15,4}$ | $b_{15,5}$ | $b_{15,6}$ | $b_{15,7}$ | $b_{15,8}$ | $b_{15,9}$ | $b_{15,10}$ | $b_{15,11}$ | $b_{15,12}$ | $b_{15,13}$ | $b_{15,14}$ | $b_{15,15}$ |

FIG. 7C

| $r_{-1,-1}$ | $r_{-1,0}$ | $r_{-1,1}$ | $r_{-1,2}$ | $r_{-1,3}$ | $r_{-1,4}$ | $r_{-1,5}$ | $r_{-1,6}$ | $r_{-1,7}$ | $r_{-1,8}$ | $r_{-1,9}$ | $r_{-1,10}$ | $r_{-1,11}$ | $r_{-1,12}$ | $r_{-1,13}$ | $r_{-1,14}$ | $r_{-1,15}$ |
|---|---|---|---|---|---|---|---|---|---|---|---|---|---|---|---|---|
| $r_{0,-1}$ | $r_{0,0}$ | $r_{0,1}$ | $r_{0,2}$ | $r_{0,3}$ | $r_{0,4}$ | $r_{0,5}$ | $r_{0,6}$ | $r_{0,7}$ | $r_{0,8}$ | $r_{0,9}$ | $r_{0,10}$ | $r_{0,11}$ | $r_{0,12}$ | $r_{0,13}$ | $r_{0,14}$ | $r_{0,15}$ |
| $r_{1,-1}$ | $r_{1,0}$ | $r_{1,1}$ | $r_{1,2}$ | $r_{1,3}$ | $r_{1,4}$ | $r_{1,5}$ | $r_{1,6}$ | $r_{1,7}$ | $r_{1,8}$ | $r_{1,9}$ | $r_{1,10}$ | $r_{1,11}$ | $r_{1,12}$ | $r_{1,13}$ | $r_{1,14}$ | $r_{1,15}$ |
| $r_{2,-1}$ | $r_{2,0}$ | $r_{2,1}$ | $r_{2,2}$ | $r_{2,3}$ | $r_{2,4}$ | $r_{2,5}$ | $r_{2,6}$ | $r_{2,7}$ | $r_{2,8}$ | $r_{2,9}$ | $r_{2,10}$ | $r_{2,11}$ | $r_{2,12}$ | $r_{2,13}$ | $r_{2,14}$ | $r_{2,15}$ |
| $r_{3,-1}$ | $r_{3,0}$ | $r_{3,1}$ | $r_{3,2}$ | $r_{3,3}$ | $r_{3,4}$ | $r_{3,5}$ | $r_{3,6}$ | $r_{3,7}$ | $r_{3,8}$ | $r_{3,9}$ | $r_{3,10}$ | $r_{3,11}$ | $r_{3,12}$ | $r_{3,13}$ | $r_{3,14}$ | $r_{3,15}$ |
| $r_{4,-1}$ | $r_{4,0}$ | $r_{4,1}$ | $r_{4,2}$ | $r_{4,3}$ | $r_{4,4}$ | $r_{4,5}$ | $r_{4,6}$ | $r_{4,7}$ | $r_{4,8}$ | $r_{4,9}$ | $r_{4,10}$ | $r_{4,11}$ | $r_{4,12}$ | $r_{4,13}$ | $r_{4,14}$ | $r_{4,15}$ |
| $r_{5,-1}$ | $r_{5,0}$ | $r_{5,1}$ | $r_{5,2}$ | $r_{5,3}$ | $r_{5,4}$ | $r_{5,5}$ | $r_{5,6}$ | $r_{5,7}$ | $r_{5,8}$ | $r_{5,9}$ | $r_{5,10}$ | $r_{5,11}$ | $r_{5,12}$ | $r_{5,13}$ | $r_{5,14}$ | $r_{5,15}$ |
| $r_{6,-1}$ | $r_{6,0}$ | $r_{6,1}$ | $r_{6,2}$ | $r_{6,3}$ | $r_{6,4}$ | $r_{6,5}$ | $r_{6,6}$ | $r_{6,7}$ | $r_{6,8}$ | $r_{6,9}$ | $r_{6,10}$ | $r_{6,11}$ | $r_{6,12}$ | $r_{6,13}$ | $r_{6,14}$ | $r_{6,15}$ |
| $r_{7,-1}$ | $r_{7,0}$ | $r_{7,1}$ | $r_{7,2}$ | $r_{7,3}$ | $r_{7,4}$ | $r_{7,5}$ | $r_{7,6}$ | $r_{7,7}$ | $r_{7,8}$ | $r_{7,9}$ | $r_{7,10}$ | $r_{7,11}$ | $r_{7,12}$ | $r_{7,13}$ | $r_{7,14}$ | $r_{7,15}$ |
| $r_{8,-1}$ | $r_{8,0}$ | $r_{8,1}$ | $r_{8,2}$ | $r_{8,3}$ | $r_{8,4}$ | $r_{8,5}$ | $r_{8,6}$ | $r_{8,7}$ | $r_{8,8}$ | $r_{8,9}$ | $r_{8,10}$ | $r_{8,11}$ | $r_{8,12}$ | $r_{8,13}$ | $r_{8,14}$ | $r_{8,15}$ |
| $r_{9,-1}$ | $r_{9,0}$ | $r_{9,1}$ | $r_{9,2}$ | $r_{9,3}$ | $r_{9,4}$ | $r_{9,5}$ | $r_{9,6}$ | $r_{9,7}$ | $r_{9,8}$ | $r_{9,9}$ | $r_{9,10}$ | $r_{9,11}$ | $r_{9,12}$ | $r_{9,13}$ | $r_{9,14}$ | $r_{9,15}$ |
| $r_{10,-1}$ | $r_{10,0}$ | $r_{10,1}$ | $r_{10,2}$ | $r_{10,3}$ | $r_{10,4}$ | $r_{10,5}$ | $r_{10,6}$ | $r_{10,7}$ | $r_{10,8}$ | $r_{10,9}$ | $r_{10,10}$ | $r_{10,11}$ | $r_{10,12}$ | $r_{10,13}$ | $r_{10,14}$ | $r_{10,15}$ |
| $r_{11,-1}$ | $r_{11,0}$ | $r_{11,1}$ | $r_{11,2}$ | $r_{11,3}$ | $r_{11,4}$ | $r_{11,5}$ | $r_{11,6}$ | $r_{11,7}$ | $r_{11,8}$ | $r_{11,9}$ | $r_{11,10}$ | $r_{11,11}$ | $r_{11,12}$ | $r_{11,13}$ | $r_{11,14}$ | $r_{11,15}$ |
| $r_{12,-1}$ | $r_{12,0}$ | $r_{12,1}$ | $r_{12,2}$ | $r_{12,3}$ | $r_{12,4}$ | $r_{12,5}$ | $r_{12,6}$ | $r_{12,7}$ | $r_{12,8}$ | $r_{12,9}$ | $r_{12,10}$ | $r_{12,11}$ | $r_{12,12}$ | $r_{12,13}$ | $r_{12,14}$ | $r_{12,15}$ |
| $r_{13,-1}$ | $r_{13,0}$ | $r_{13,1}$ | $r_{13,2}$ | $r_{13,3}$ | $r_{13,4}$ | $r_{13,5}$ | $r_{13,6}$ | $r_{13,7}$ | $r_{13,8}$ | $r_{13,9}$ | $r_{13,10}$ | $r_{13,11}$ | $r_{13,12}$ | $r_{13,13}$ | $r_{13,14}$ | $r_{13,15}$ |
| $r_{14,-1}$ | $r_{14,0}$ | $r_{14,1}$ | $r_{14,2}$ | $r_{14,3}$ | $r_{14,4}$ | $r_{14,5}$ | $r_{14,6}$ | $r_{14,7}$ | $r_{14,8}$ | $r_{14,9}$ | $r_{14,10}$ | $r_{14,11}$ | $r_{14,12}$ | $r_{14,13}$ | $r_{14,14}$ | $r_{14,15}$ |
| $r_{15,-1}$ | $r_{15,0}$ | $r_{15,1}$ | $r_{15,2}$ | $r_{15,3}$ | $r_{15,4}$ | $r_{15,5}$ | $r_{15,6}$ | $r_{15,7}$ | $r_{15,8}$ | $r_{15,9}$ | $r_{15,10}$ | $r_{15,11}$ | $r_{15,12}$ | $r_{15,13}$ | $r_{15,14}$ | $r_{15,15}$ |

IMAGE ENCODING/DECODING METHOD AND APPARATUS

CROSS-REFERENCE TO RELATED PATENT APPLICATION

This application claims priority from Korean Patent Application No. 10-2006-0062440, filed on Jul. 4, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to image encoding and decoding, and more particularly, to an image encoding/decoding method and apparatus, in which the other color component image(s) except for one of a plurality of color component images of an image is predicted from motion estimation information or a reconstructed color component image of the one of the plurality of color component images using correlation among the plurality of color component images, thereby improving encoding efficiency.

2. Description of the Related Art

In general, when an image is captured, the captured original image is in a red, green and blue (RGB) color format. To encode the RGB color format image, the RGB color format image is transformed into a YUV (or YCbCr) color format. Y is a black-white image and has a luminance component, and U (or Cb) and V (or Cr) have color components. Information is uniformly distributed over R, G, and B components in an RGB image, but information is concentrated on a Y component and the amount of information in U (or Cb) and V (or Cr) components is small in a YUV (or YCbCr) image. Thus, the YUV (or YCbCr) image can be compressed with high compression efficiency. To further improve compression efficiency, a YUV (or YCbCr) 4:2:0 image obtained by sampling color components U (or Cb) and V (or Cr) of a YUV (or YCbCr) image at a ratio of 1:4 is generally used.

However, since 1/4 sampling of U (or Cb) and V (or Cr) components in a YUV (or YCbCr) 4:2:0 image causes color distortion, it is not suitable for providing high display quality. Thus, a method for effectively encoding a YUV (or YCbCr) 4:4:4 image without sampling U (or Cb) and V (or Cr) is required. Recently, residual color transform (RCT) which directly encodes an RGB 4:4:4 image to remove color distortion occurring in transformation of an RGB image to a YUV (or YCbCr) image has been suggested.

When an image like a YUV (or YCbCr) 4:4:4 image and an RGB 4:4:4 image in which color components have the same resolution is directly encoded using a related art encoding method, encoding efficiency is degraded. Thus, a method for improving encoding efficiency while maintaining high display quality by prediction based on the statistical characteristics of an image is required for a case where a YUV (or YCbCr) 4:4:4 image is encoded or an RGB image is encoded in an RGB domain without being transformed to a YUV (or YCbCr) format.

SUMMARY OF THE INVENTION

The present invention provides an image encoding/decoding method and apparatus, in which at least one of a plurality of color component images of an image, except a first color component image, is predicted from motion estimation information or a reconstructed color component image of the first color component image using correlation between the plurality of color component images, thereby improving encoding efficiency.

According to one aspect of the present invention, there is provided an image encoding method including: performing predictive-encoding on a pixel block of predetermined size of a first color component image, which will be referred to as a first color component pixel block, among color component images of at least two color components included in an input image; performing motion estimation on at least one of the other color component pixel blocks corresponding to the first color component pixel block in order to generate a first prediction pixel block candidate for at least one of the other color component pixel blocks; reconstructing the predictive-encoded first color component pixel block; predicting the at least one of the other color component pixel blocks using the reconstructed first color component pixel block in order to generate a second prediction pixel block candidate for the at least one of the other color component pixel blocks; and determining one of the first prediction pixel block candidate and the second prediction pixel block candidate to be a prediction pixel block of the at least one of the other color component pixel blocks.

According to another aspect of the present invention, there is provided an image encoder including: a first prediction pixel block candidate generation unit, a reconstruction unit, a second prediction pixel block candidate generation unit, and a determination unit. The first prediction pixel block candidate generation unit performs motion estimation on at least one of the other color component pixel blocks corresponding to a first color component pixel block of a previously predictive-encoded first color component image of an input image in order to generate a first prediction pixel block candidate. The reconstruction unit reconstructs the predictive-encoded first color component pixel block. The second prediction pixel block candidate generation unit predicts the at least one of the other color component pixel blocks using the reconstructed first color component pixel block in order to generate a second prediction pixel block candidate for the at least one of the other color component pixel blocks. The determination unit determines one of the first prediction pixel block candidate and the second prediction pixel block candidate to be a prediction pixel block of the at least one of the other color component pixel blocks.

According to another aspect of the present invention, there is provided an image decoding method including: decoding a first color component pixel block of a first color component image included in an input bitstream; generating a prediction pixel block of at least one of the other color component pixel blocks by performing at least one of motion compensation on the at least one of the other color component pixel blocks corresponding to the first color component pixel block, and prediction using the decoded first color component pixel block according to prediction mode information included in the bitstream; and decoding the at least one of the other color component pixel blocks using the generated prediction pixel block of the at least one of the other color component pixel blocks.

According to another aspect of the present invention, there is provided an image decoder including a first decoding unit, a prediction pixel block generation unit, and a second decoding unit. The first decoding unit decodes a first color component pixel block of a first color component image included in an input bitstream. The prediction pixel block generation unit generates a prediction pixel block of at least one of the other color component pixel blocks by performing at least one of motion compensation on the at least one of the other color component pixel blocks corresponding to the first color component pixel block, and prediction using the decoded first color component pixel block according to prediction mode information included in the bitstream. The second decoding unit decodes the at least one of the other color component pixel blocks using the generated prediction pixel blocks of the at least one of the other color component pixel blocks.

BRIEF DESCRIPTION OF THE DRAWINGS

The above and other aspects of the present invention will become more apparent by describing in detail exemplary embodiments thereof with reference to the attached drawings, in which:

FIG. 5 is a flowchart illustrating an image encoding method according to an exemplary embodiment of the present invention;

FIG. 7A illustrates a 16×16 pixel block of a G color component image included in an input image according to an exemplary embodiment of the present invention;

FIG. 7B illustrates a 16×16 pixel block of a B color component image included in the input image according to an exemplary embodiment of the present invention;

FIG. 7C illustrates a 16×16 pixel block of an R color component image included in the input image according to an exemplary embodiment of the present invention;

DETAILED DESCRIPTION OF EXEMPLARY EMBODIMENTS

Hereinafter, exemplary embodiments of the present invention will be described in detail with reference to the accompanying drawings.

Figure 1A:
FIGS. 1A through 1C illustrate red (R) color component image, green (G) color component image, and a blue (B) color component image of a single color image.
Figure 1B:
Figure 1C:
Figure 2A:
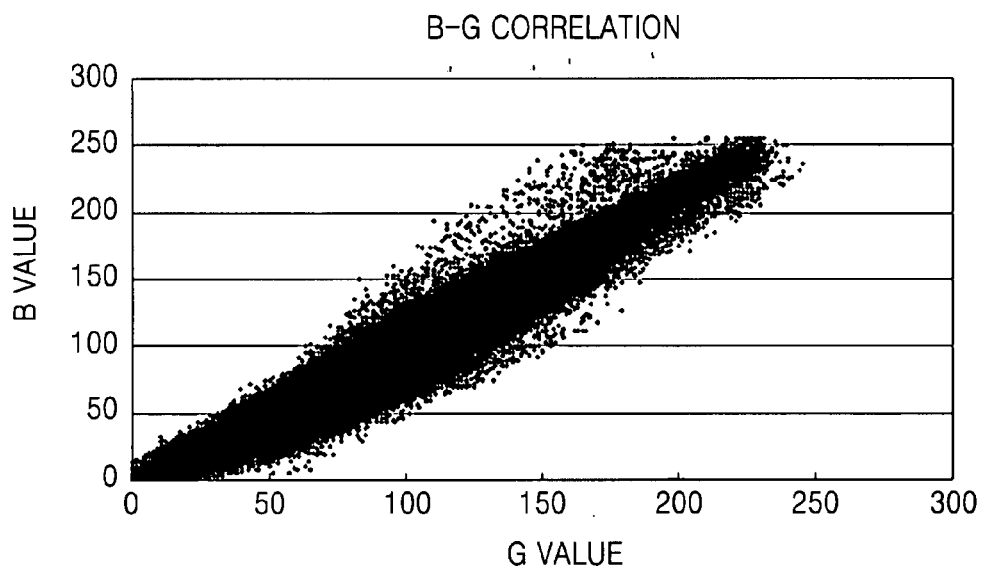
FIG. 2A is a graph showing correlation between the G color component image of FIG. 1B and the B color component image of FIG. 1C according to an exemplary embodiment of the present invention.
Figure 2B:
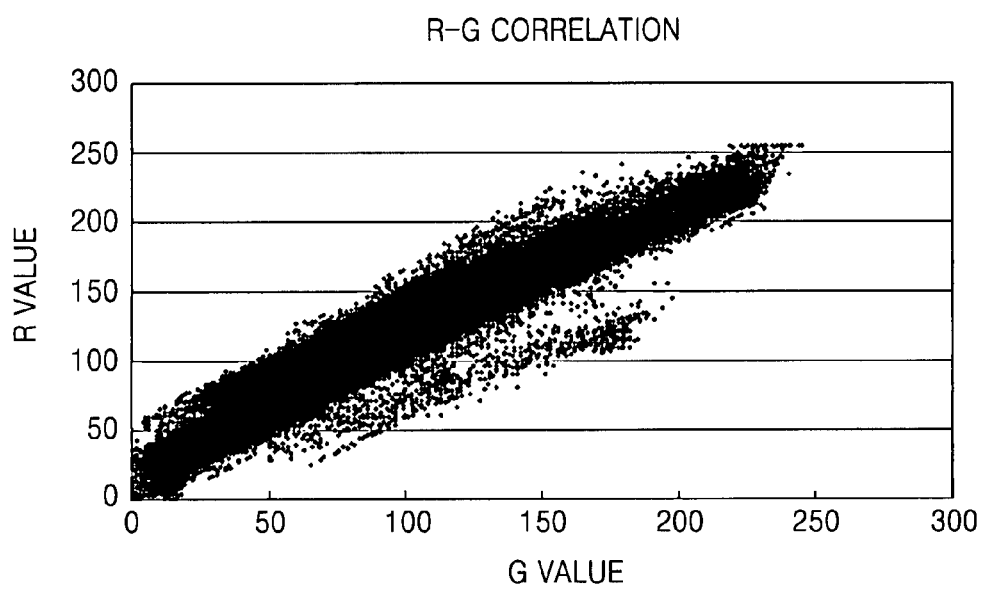
FIG. 2B is a graph showing correlation between the R color component image of FIG. 1A and the G color component image of FIG. 1B according to an exemplary embodiment of the present invention.

FIGS. 1A through 1C illustrate an R color component image, a G color component image, and a B color component image of a single color image, FIG. 2A is a graph showing correlation between the G color component image of FIG. 1B and the B color component image of FIG. 1C according to an exemplary embodiment of the present invention, and FIG. 2B is a graph showing correlation between the R color component image of FIG. 1A and the G color component image of FIG. 1B according to an exemplary embodiment of the present invention.

In general, when a color image is encoded, predictive encoding is performed on each of color component images to remove redundant information in each of color components. Referring to FIGS. 1A through 1C, pixels of RGB color component images of a single color image at the same position have similar pixel values, which can also be seen from graphs illustrated in FIGS. 2A and 2B. In addition, there exists strong correlation among pixel blocks of RGB color component images after motion estimation and compensation.

Thus, according to an exemplary embodiment of the present invention, after a predetermined first color component image among a plurality of color component images of an image is predictive-encoded according to a general predictive-encoding standard such as H.264, motion estimation and compensation are performed on the remaining color component image(s) using a motion vector generated by motion estimation of the first color component image based on correlation between the plurality of color component images, or the other color component image(s) is predicted from a reconstructed first color component image. For example, if an image includes three color components of RGB, a G color component image is first predictive-encoded, motion estimation and compensation are performed on a corresponding R color component image and a corresponding B color component image using the same motion vector as that determined in motion estimation of the G color component image. In this example, the R color component image and the B color component image may be predicted using a reconstructed G color component image. Also, in this example, the R color component image may be predicted using the reconstructed G color component image, and the B color component image may be predicted using a reconstructed R color component image, according to an exemplary embodiment of the present invention. In this example, the encoding order of the color component images may vary.

As another example, according to the present invention, after the G color component image is first predictive-encoded, motion estimation and compensation are performed on the R color component image and the B color component image. In this example, the R color component image and the B color component image may be predicted using the reconstructed G color component image. Alternatively, after the G color component image is first predictive-encoded, motion estimation and compensation are performed on the R color component image and the B color component image, or the R color component image is predicted using the reconstructed G color component image and the B color component image is predicted using the reconstructed R color component image. In this example, the encoding order of the color component images may also vary.

Figure 3:
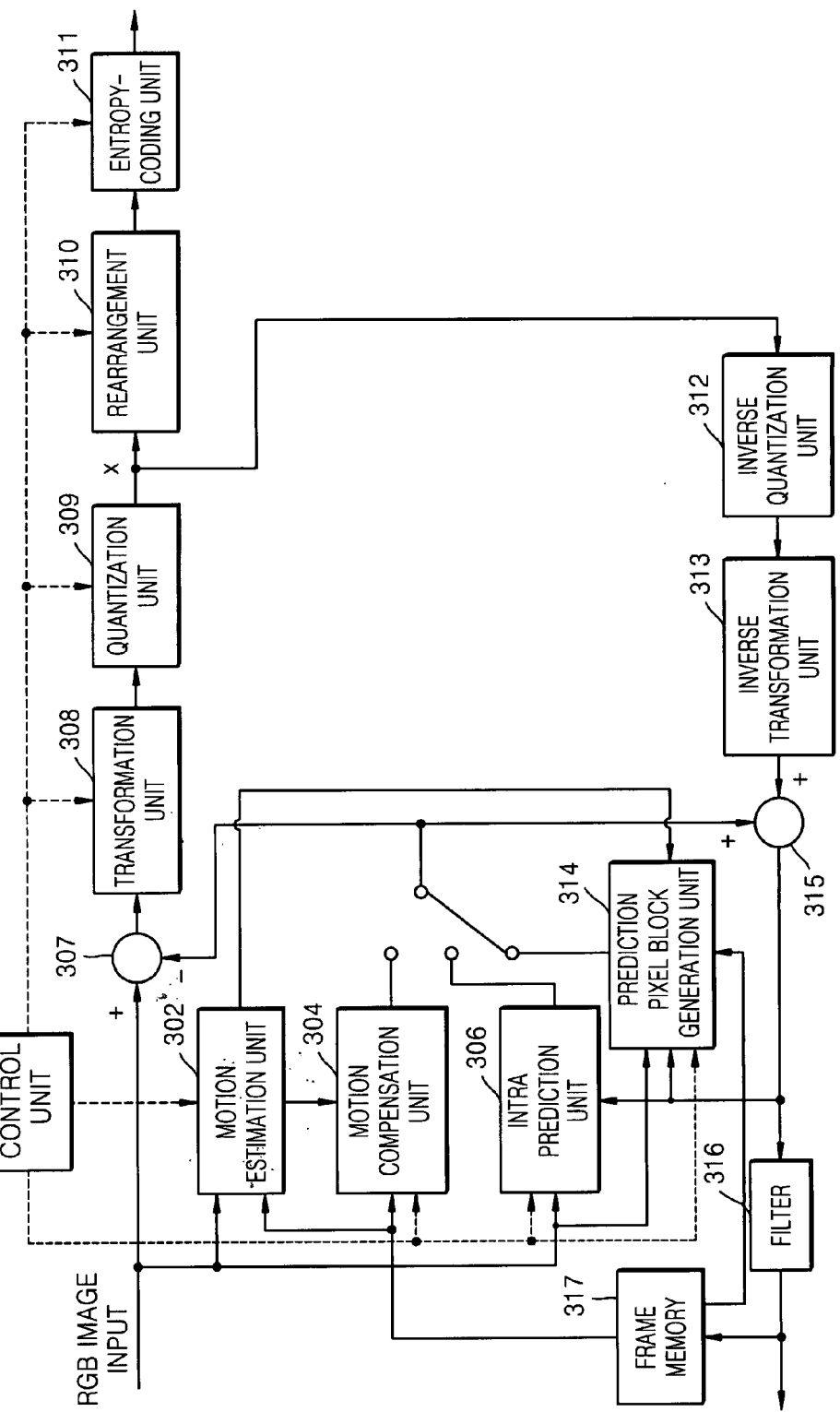
FIG. 3 is a block diagram of an image encoder according to an exemplary embodiment of the present invention.

FIG. 3 is a block diagram of an image encoder 300 according to an exemplary embodiment of the present invention. Although the image encoder 300 is assumed to comply with the H.264 standard for convenience of explanation, it may also be applied to image encoders of other standards.

Referring to FIG. 3, the image encoder 300 includes a motion estimation unit 302, a motion compensation unit 304, an intraprediction unit 306, a subtraction unit 307, a transformation unit 308, a quantization unit 309, a rearrangement unit 310, an entropy-coding unit 311, an inverse quantization unit 312, an inverse transformation unit 313, a prediction pixel block generation unit 314, an addition unit 315, a filter 316, a frame memory 317, and a control unit 318.

The motion estimation unit 302 and the motion compensation unit 304 perform interprediction in which a prediction pixel block of the current pixel block is searched for in a past or future reference frame. The motion estimation unit 302 transmits a motion vector determined by motion estimation of a pixel block of predetermined size of a first color component image (hereinafter, referred to as a first color component pixel block) to the motion compensation unit 304 and the prediction pixel block generation unit 314. As will be described later, the motion vector of the first color component pixel block is used as a motion vector for motion estimation and compensation of the other color component pixel block(s) corresponding to the first color component pixel block. As mentioned above, instead of the motion vector of the first color component pixel block, a motion vector generated by motion estimation of the other color component pixel block(s) may be used.

The intraprediction unit 306 performs intraprediction in which the prediction pixel block of the current pixel block is searched for in the current frame. More specifically, the intraprediction unit 306 divides the first color component image into pixel blocks of predetermined size. The intraprediction unit 306 then performs intraprediction on the divided pixel block of the first color component image in an intraprediction mode that is available according to the size of the divided pixel block, e.g., a 16×16 intraprediction mode, a 4×4 intraprediction mode, and an 8×8 intraprediction mode.

The subtraction unit 307 generates a first residue by subtracting a prediction pixel block generated by interprediction or intraprediction from an input first color component pixel block. The generated first residue is transformed into a frequency domain by the transformation unit 308 and is quantized by the quantization unit 309. Transformation coefficients of the quantized first residue are rearranged by the rearrangement unit 310 and then encoded by the entropy-coding unit 314 to be output in the form of a bitstream.

The transformed and quantized first residue is inversely quantized by the inverse quantization unit 312 and is inversely transformed by the inverse transformation unit 313. The addition unit 315 adds the inversely quantized and inversely transformed first residue to the prediction pixel block of the first color component pixel block, thereby reconstructing the first color component pixel block. The reconstructed first color component image passes through the filter 316 that performs deblocking filtering and is stored in the frame memory 317 to be used for interprediction of a next frame. The reconstructed first color component pixel block is input to the intraprediction unit 306 to be used as a reference value for intraprediction of a next pixel block. The reconstructed first color component pixel block is also input to the prediction pixel block generation unit 314 for prediction of the other color component pixel block(s).

Figure 4:
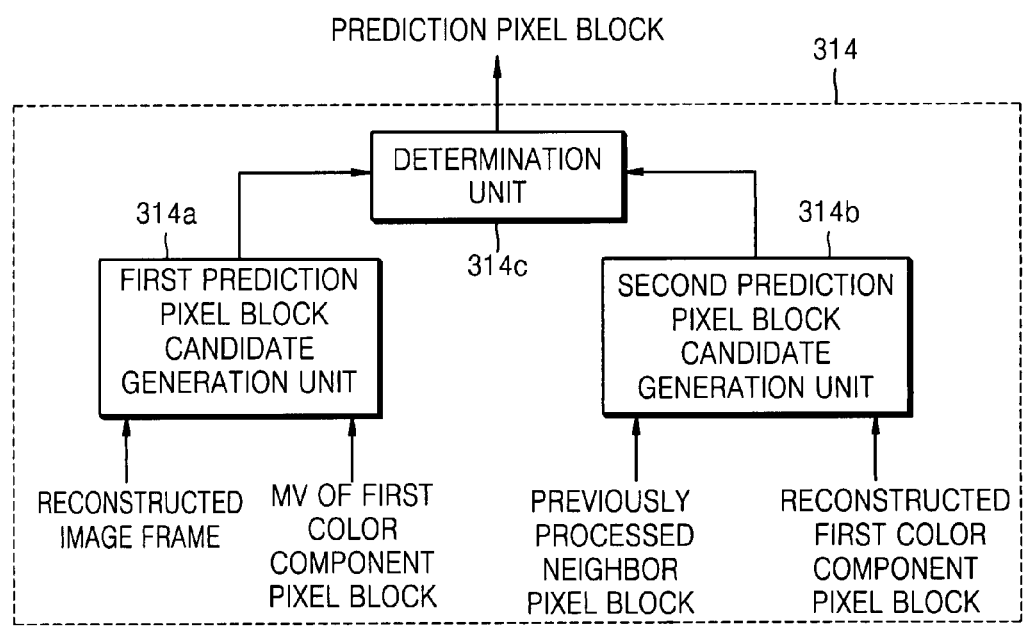
FIG. 4 is a detailed block diagram of a prediction pixel block generation unit illustrated in FIG. 3, according to an exemplary embodiment of the present invention

FIG. 4 is a detailed block diagram of the prediction pixel block generation unit 314 illustrated in FIG. 3, according to an exemplary embodiment of the present invention.

The prediction pixel block generation unit 314 performs motion estimation and compensation on the other color component image(s) of a plurality of color component images forming a color image except a first color component image using a motion vector generated by motion estimation of the first color component image based on correlation between the plurality of color component images in order to generate a first prediction pixel block candidate for a pixel block(s) of the other color component image(s). The prediction pixel block generation unit 314 also generates a second prediction pixel block candidate for a pixel block(s) of the other color component image(s) using the reconstructed first color component image. Out of the first and second prediction pixel block candidates for a pixel block(s) of the other color component image(s), the prediction pixel block generation unit 314 determines a final prediction pixel block of the other color component pixel block(s) by comparing a cost of the first prediction pixel block candidate and a cost of the second prediction pixel block candidate, and outputs the determined final prediction pixel block of the other color component pixel block(s).

Referring to FIG. 4, the prediction pixel block generation unit 314 includes a first prediction pixel block candidate generation unit 314a, a second prediction pixel block candidate generation unit 314b, and a determination unit 314c.

The first prediction pixel block candidate generation unit 314a performs motion estimation and compensation on a pixel block(s) of the other color component image(s) corresponding to the first color component pixel block using the motion vector of the first color component pixel block input from the motion estimation unit 302 in order to generate the first prediction pixel block candidate for the other color component pixel block (s). As mentioned above, the first prediction pixel block candidate generation unit 314a may also perform motion estimation and compensation on the pixel block(s) of the other color component image(s) in order to generate the first prediction pixel block candidate for the pixel block(s) of the other color component image(s) without using the motion vector of the first color component pixel block according to the related art motion estimation and compensation.

The second prediction pixel block candidate generation unit 314b predicts the pixel block(s) of the other color component image(s) using the pixel block of predetermined size of the reconstructed first color component image. Referring back to FIGS. 2A and 2B, pixel values of a plurality of color component images forming a color image have correlation with one another and such correlation can be linearly modeled as a first-order function. The second prediction pixel block candidate generation unit 314b generates the second prediction pixel block candidate for the pixel block(s) of the other color component image(s) corresponding to the reconstructed first color component pixel block using, as a parameter, a pixel value of the first color component pixel block reconstructed using a predictor generated by linear modeling. The linear modeling for prediction of the other color component pixel block(s) from the reconstructed first color component pixel block will be described later.

When an input image including at least three color component images such as an RGB color image are predictive-encoded, the second prediction pixel block candidate generation unit 314b may predict both a pixel block of a second color component image (hereinafter, referred to as a second color component pixel block) and a pixel block of a third color component image (hereinafter, referred to as a third color component pixel block) using the reconstructed first color component pixel block in order to generate the second prediction pixel block candidate for the second color component pixel block and the third color component pixel block. Also, the second prediction pixel block candidate generation unit 314b may generate the second prediction pixel block candidate for the second color component pixel block from the reconstructed first color component pixel block and the second prediction pixel block candidate for the third color component pixel block from the reconstructed second color component pixel block. In other words, the second prediction pixel block candidate generation unit 314b may generate the second prediction pixel block candidate for the other color component image(s) from the reconstructed first color component image, or may generate the second prediction pixel block candidate for another color component image from the remaining color component image that is previously processed and reconstructed.

The determination unit 314c compares a cost of the first prediction pixel block candidate and a cost of the second prediction pixel block candidate for the other color component image(s) in order to determine a final prediction pixel block of the other color component pixel block(s). For example, the determination unit 314c may calculate the amount of bits and distortion of display quality for the first prediction pixel block candidate and the second prediction pixel block candidate using a well-known rate-distortion cost, and determine a prediction pixel block candidate having the smallest result of summing up the amount of bits and distortion of display quality to be the final prediction pixel block. At this time, the amount of bits may be calculated after transformation and quantization and then entropy-encoding, and the distortion of display quality may be the average sum of squares of differences between a reconstructed image and the original image. Alternatively, to reduce the amount of computation, only distortion costs may be compared to determine the final prediction pixel block.

Referring back to FIG. 3, the subtraction unit 307 subtracts prediction pixel blocks of the second color component image and the third color component image generated by the prediction pixel block generation unit 314 from the pixel blocks of the original second color component image and the original third color component image, thereby generating a second residue and a third residue. Like the first residue, the second residue and the third residue are encoded by transformation, quantization, and entropy-coding and are output in the form of a bitstream.

The transformed and quantized second residue and third residue are inversely quantized by the inverse quantization unit 312 and inversely transformed by the inverse transformation unit 313, and the addition unit 315 adds the inversely quantized and inversely transformed second residue and third residue to the prediction pixel blocks of the second and third color component images predicted by the prediction pixel block generation unit 314, thereby reconstructing pixel blocks of the second color component image and the third color component image. The reconstructed second and third color component images pass through the filter 316 that performs deblocking filtering, and are stored in the frame memory 317 to be used for interprediction of a next frame. When the third color component pixel block is predicted from the reconstructed second color component pixel block, the second color component pixel block reconstructed by the addition unit 315 is input to the prediction pixel block generation unit 314.

The control unit 318 controls components of the image encoder 300 and determines a prediction mode for the current pixel block. More specifically, the control unit 318 calculates a cost of an interpredicted image, a cost of an intrapredicted image and a cost of an image predicted using correlation between color component images, and determines a prediction mode having the smallest cost to be a final prediction mode. The control unit 318 may select related art interprediction or intraprediction for encoding each of the color component images instead of predictive encoding according to an exemplary embodiment of the present invention if a cost of a predicted image according to the exemplary embodiment of the present invention is greater than a predetermined threshold.

The control unit 318 also calculates a reference value indicating correlation between color component images as illustrated in FIGS. 2A and 2B and may select related art interprediction or intraprediction for encoding each of the color component images instead of predictive encoding according to an exemplary embodiment of the present invention if the reference value is less than a predetermined threshold. Here, the reference value may be a dispersion value or a standard deviation indicating the degree of dispersion between color component images.

Prediction mode information is inserted into a header of a bitstream of an image encoded by an image encoding method according to an exemplary embodiment of the present invention to perform decoding based on the correlation between color component images according an exemplary embodiment of to the present invention.

FIG. 5 is a flowchart illustrating an image encoding method according to an exemplary embodiment of the present invention. Hereinafter, the image encoder 300 and the image encoding method according to the exemplary embodiment of the present invention will be described with reference to FIGS. 3 through 5.

In operation 510, the intraprediction unit 306 performs predictive-encoding on a pixel block of predetermined size of a first color component image selected from a plurality of color component images of an input color image. As mentioned above, the motion estimation unit 302 and the motion compensation unit 304 generate a temporal prediction pixel block of the first color component pixel block by performing motion estimation and compensation on the first color component pixel block. The intraprediction unit 306 also generates a spatial prediction pixel block of the pixel first color component pixel block by performing intraprediction on the first color component pixel block. The control unit 318 calculates the amount of bits and distortion of display quality for the temporal prediction pixel block and the spatial prediction pixel block of the first color component pixel block, and determines a prediction pixel block having the smallest cost to be the final prediction pixel block of the first color component pixel block. The first residue that is a difference between the determined finial prediction pixel block, and the original first color component pixel block is transformed, quantized, and entropy-encoded and then output as a bitstream.

In operation 520, the first prediction pixel block candidate generation unit 314a of the prediction pixel block generation unit 314 determines the motion vector of the first color component pixel block input from the motion estimation unit 302 to be a motion vector for the other color component pixel block(s) corresponding to the first color component pixel block, and determines a pixel block of a reference frame indicated by the determined motion vector of the other color component pixel block(s) to be the first prediction pixel block candidate for the other color component pixel block(s).

Figure 6A:
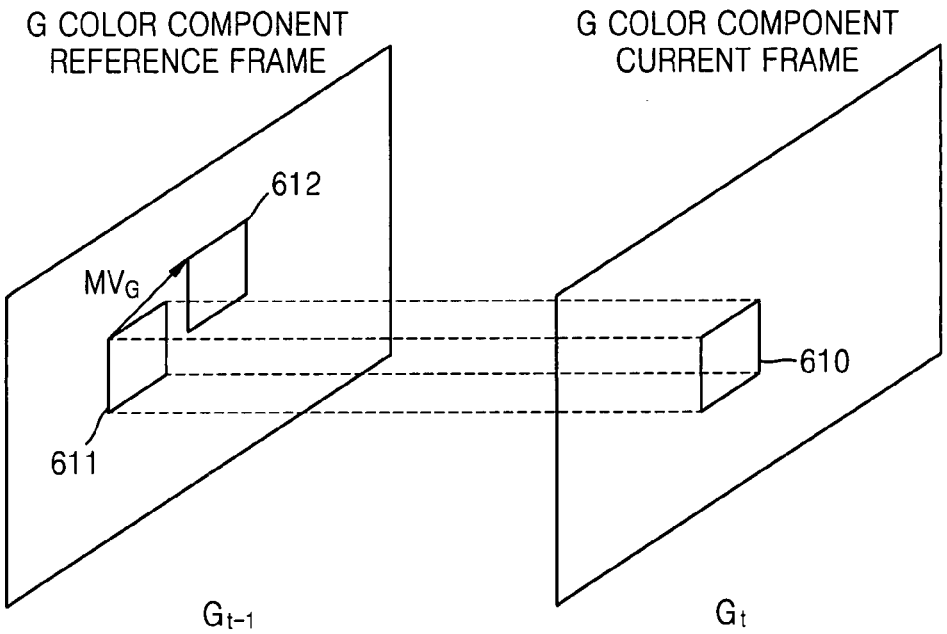
FIGS. 6A and 6B are views for explaining a process in which a first prediction pixel block candidate generation unit illustrated in FIG. 4 generates a first prediction pixel block(s) of a pixel block(s) of the other color component image(s), according to an exemplary embodiment of the present invention.
Figure 6B:
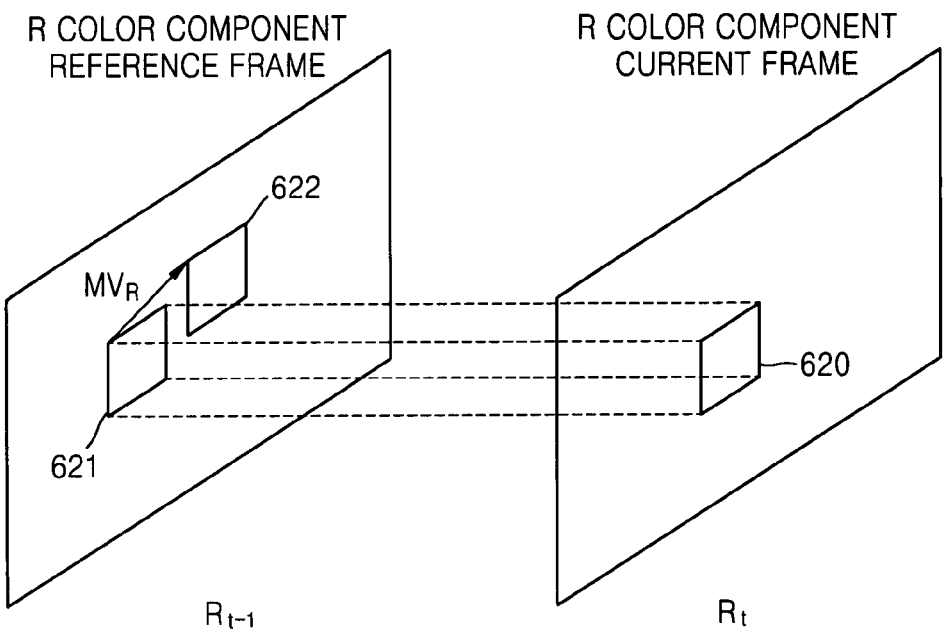

FIGS. 6A and 6B are views, according to an exemplary embodiment of the present invention, for explaining a process in which the first prediction pixel block candidate generation unit 314a of FIG. 4 generates the first prediction pixel block candidate for the other color component pixel block(s). In FIG. 6A, 610 indicates a G color component pixel block encoded in a current frame $G_t$ of a G color component image, 611 indicates a G color component pixel block at the same position as the G color component pixel block 610 in a G color component reference frame $G_{t-1}$ referred to in motion estimation of the G color component pixel block 610, and 612 indicates a G color component reference pixel block determined by motion estimation. In FIG. 6B, 620 indicates an R color component pixel block encoded in an R color component current frame $R_t$, 621 indicates an R color component pixel block at the same position as the R color component pixel block 610 in an R color component reference frame $R_{t-1}$ referred to in motion estimation of the R color component pixel block 610, and 622 indicates an R color component reference pixel block determined by motion estimation.

If the first color component image is the G color component image, the first prediction pixel block candidate generation unit 314a determines the same motion vector as a motion vector $MV_G$ of the G color component pixel block 610 generated by the motion estimation unit 302 to be a motion vector $MV_R$ of the R color component pixel block 620. The first prediction pixel block candidate generation unit 314a determines the reference pixel block 622, indicated by the motion vector $MV_R$ of the R color component pixel block that is the same as the motion vector $MV_G$ of the G color component pixel block 610 in the R color component reference frame $R_{t-1}$ that is spatially the same as the G color component reference frame $G_{t-1}$ referred to by the motion vector $MV_G$ of the G color component pixel block 610, to be the first prediction pixel block candidate for the current R color component pixel block. Similarly, the first prediction pixel block candidate generation unit 314a determines a reference pixel block, indicated by a motion vector $MV_B$ of a B color component pixel block that is the same as the motion vector $MV_G$ of the G color component pixel block 610 in a B color component reference frame that is spatially the same as the G color component reference frame $G_{t-1}$ referred to by the motion vector $MV_G$ of the G color component pixel block 610, to be the first prediction pixel block candidate for the current B color component pixel block. In this case, it is not necessary to transmit motion vectors corresponding to the B color component pixel block and the R color component pixel block to an decoding end. As mentioned above, the motion estimation unit 302 may perform motion estimation on the B color component pixel block and the R color component pixel block in order to determine pixel block candidates for the first prediction pixel block corresponding to the resulting motion vectors. In this case, motion vector information corresponding to the B color component pixel block and the R color component pixel block should be transmitted to the decoding end.

In operation 530, the first residue generated in predictive-encoding of the first color component pixel block is inversely quantized and inversely transformed, and the inversely quantized and inversely transformed first residue is added to a prediction pixel block of the first color component pixel block, thereby reconstructing the first color component pixel block.

In operation 540, the second prediction pixel block candidate generation unit 314b generates a second prediction pixel block(s) of the other color component pixel block(s) using the reconstructed first color component pixel block.

FIG. 7A illustrates a 16×16 pixel block 710 of a G color component image included in an input image according to an exemplary embodiment of the present invention, FIG. 7B illustrates a 16×16 pixel block 720 of a B color component image included in the input image according to an exemplary embodiment of the present invention, and FIG. 7C illustrates a 16×16 pixel block 730 of an R color component image included in the input image according to an exemplary embodiment of the present invention. $g_{ij}$, $b_{ij}$, and $r_{ij}$ indicate pixel values in an $i^{th}$ row and a $j^{th}$ column of a 16×16 pixel block of each of the G, B, and R color component images. In FIGS. 7A through 7C, hatched pixels indicate reconstructed pixels of a neighbor pixel block processed prior to the current pixel block.

If a pixel value of a pixel in an $i^{th}$ row and a $j^{th}$ column of the reconstructed 16×16 pixel block of the G color component image is $g'_{ij}$ and a prediction value of a pixel corresponding to $g'_{ij}$ in an $i^{th}$ row and a $j^{th}$ column of a pixel block of the B color component image is $\overline{b_{ij}}$, a predetermined weight is a, and a predetermined offset value is b, the second prediction pixel block candidate generation unit 314b performs modeling correlation between pixel values of the reconstructed G color component pixel block, and pixel values of a B color component pixel block corresponding to the reconstructed G color component pixel block as a first-order function like Equation 1, and predicts the pixel values of the B color component pixel block using the pixel values of the reconstructed G color component pixel block as parameter.

$$\overline{b_{ij}} = a \times g'_{ij} + b \qquad (1)$$

Prediction pixel values obtained using Equation 1 are clipped to integers between 0 and 255 if they are expressed with 8 bits. a and b may vary according to the position (i, j) of a pixel, but they are assumed to be constant in a predetermined block in the current exemplary embodiment of the present invention.

In an exemplary embodiment of the present invention, a and b may be determined to be function values using pixel values of a reconstructed neighbor pixel block of the G color component pixel block and pixel values of a reconstructed neighbor pixel block of the B color component pixel block like in Equations 2 and 3.

$$a = m(g'_{-1,0}, \ldots, g'_{-1,15}, g'_{0,-1}, \ldots, g'_{15,-1}, b'_{-1,0}, \ldots, b'_{-1,15}, b'_{0,-1}, \ldots, b'_{15,-1}) \qquad (2)$$

$$b = h(g'_{-1,0}, \ldots, g'_{-1,15}, g'_{0,-1}, \ldots, g'_{15,-1}, b'_{-1,0}, \ldots, b'_{-1,15}, b'_{0,-1}, \ldots, b'_{15,-1}) \qquad (3)$$

a and b may be defined variously. For example, a and b are determined to be values that minimize differences between prediction pixel values of a neighbor pixel block of the B color component pixel block predicted by Equation 1 using pixel values of a reconstructed neighbor pixel block of the G color component pixel block, and pixel values of a reconstructed neighbor pixel block of the B color component pixel block. Alternatively, a may be set to 1 and b may be defined as the average of differences between pixel values of a reconstructed neighbor pixel block of the B color component image, and pixel values of a reconstructed neighbor pixel block of the B color component image as follows:

$$b = \frac{\sum_{i=0}^{15}(b'_{-1,i} - g'_{-1,i}) + \sum_{j=0}^{15}(b'_{j,-1} - g'_{j,-1})}{32} \qquad (4)$$

Pixels of a neighbor pixel block used in the determination of a and b are not limited to pixels located above or to the left of the current pixel block. In this case, it is not necessary to transmit a and b to the decoding end because a and b can be generated in the decoding end in the same manner as in the encoding end.

In another exemplary embodiment of the present invention, a and b can be determined using pixel values in the current pixel block without using a neighbor pixel block. For example, as in Equation 5, a and b may be determined to be values that minimize a sum of differences ($r_B$) between the original pixel values $b_{i,j}$ in a 16×16 B color component pixel block, and prediction pixel values of the B color component pixel block predicted using Equation 1.

$$\text{Sum of } \mathit{diff}(r_B) = \sum_{i,j=0}^{15} |b_{i,j} - (a \cdot g'_{i,j} + b)|^p, \quad (5)$$

where p is an integer that is greater than 1.

Alternatively, a may be set to 1 and b may be determined to be the average of differences between the original pixel values $b_{i,j}$ in a 16×16 B color component pixel block, and pixel values $G'_{i,j}$ of a reconstructed 16×16 G color component pixel block.

$$b = \frac{\sum_{i=0}^{15} \sum_{j=0}^{15} (b_{i,j} - g'_{i,j})}{256} \quad (6)$$

In the above exemplary embodiments of the present invention, it is necessary to transmit a and b to the decoding end.

Once a and b of Equation 1 are determined, the second prediction pixel block candidate generation unit 314b substitutes pixel values $g'_{i,j}$ of the reconstructed G color component pixel block into Equation 1 in order to predict pixel values of the B color component pixel block, thereby generating a second prediction pixel block candidate.

To determine a and b in Equation 2, a linear regression model based method that is widely used in the field of statistics may be used.

Figure 8A:
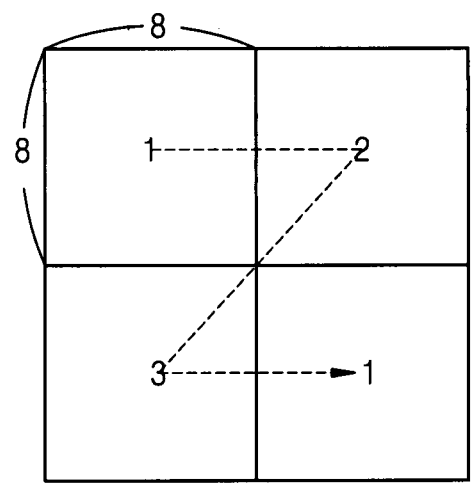
FIG. 8A illustrates the processing order of 8×8 pixel blocks in an image encoding method and an image encoder according to an exemplary embodiment of the present invention.
Figure 8B:
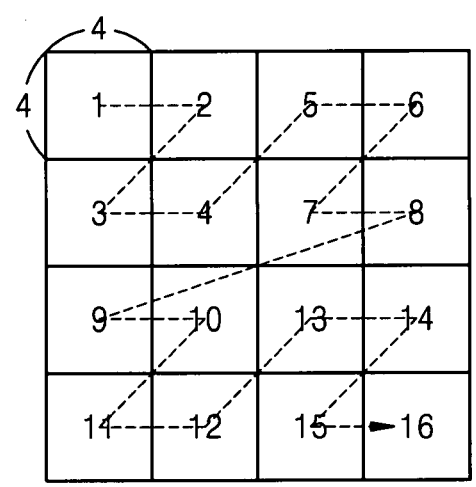
FIG. 8B illustrates the processing order of 4×4 pixel blocks in an image encoding method and an image encoder according to an exemplary embodiment of the present invention.

FIG. 8A illustrates the processing order of 8×8 pixel blocks in an image encoding method and an image encoder according to an exemplary embodiment of the present invention, and FIG. 8B illustrates the processing order of 4×4 pixel blocks in an image encoding method and an image encoder according to an exemplary embodiment of the present invention.

The second prediction pixel block candidate generation unit 314b may generate a second prediction pixel block candidate for the other color component pixel block(s) in an 8×8 block mode or a 4×4 block mode in addition to the 16×16 block mode.

Referring to FIG. 8A, when a pixel block of the B color component image is processed in an 8×8 mode, four 8×8 pixel blocks of the B color component image are sequentially predicted left-to-right and top-to-bottom. Pixel values of the 8×8 pixel blocks of the B color component image are predicted using Equation 1 in the similar manner to above-described prediction of pixel values of a 16×16 pixel block of the B color component image.

In processing in the 8×8 mode, a and b may be determined to be values that minimize differences between prediction pixel values of a neighbor pixel block of the B color component pixel block predicted by Equation 1 using pixel values of a reconstructed neighbor pixel block of the G color component pixel block, and pixel values of a reconstructed neighbor pixel block of the B color component pixel block. Otherwise, a may be set to 1, and b may be determined to be the average of differences between pixel values of a reconstructed neighbor pixel block of the B color component pixel block, and pixel values of a reconstructed neighbor pixel block of the G color component pixel block as follows:

$$b = \frac{\sum_{i=0}^{7}(b'_{-1,i} - g'_{-1,i}) + \sum_{j=0}^{7}(b'_{j,-1} - g'_{j,-1})}{16} \quad (7)$$

Alternatively, a and b may be determined to be values that minimize a sum of differences ($r_B$) between the original pixel values $b_{i,j}$ in an 8×8 B color component pixel block, and prediction pixel values of the B color component pixel block. Otherwise, a may be set to 1, and b may be determined to be the average of differences between the original pixel values $b_{i,j}$ of an 8×8 B color component pixel block, and pixel values $G'_{i,j}$ of a reconstructed 8×8 G color component pixel block as follows:

$$b = \frac{\sum_{i=0}^{7} \sum_{j=0}^{7}(b_{i,j} - g'_{i,j})}{64} \quad (8)$$

Referring to FIG. 8B, when a B color component pixel block is processed in a 4×4 mode, sixteen 4×4 B color component pixel blocks are sequentially predicted left-to-right and top-to-bottom. Pixel values of each of the 4×4 B color component pixel blocks can be predicted using Equation 1 in the similar manner to above-described prediction of pixel values of a 16×16 B color component pixel block or an 8×8 B color component pixel block.

In other words, a and b may be determined to be values that minimize differences between prediction pixel values of a reconstructed neighbor pixel block of the B color component pixel block predicted by Equation 1 using pixel values of a reconstructed neighbor pixel block of the G color component pixel block, and pixel values of a reconstructed neighbor pixel block of the B color component pixel block. Otherwise, a may be set to 1, and b may be defined as the average of differences between pixel values of a reconstructed neighbor pixel block of the B color component pixel block, and pixel values of a reconstructed neighbor pixel block of the G color component pixel block as follows:

$$b = \frac{\sum_{i=0}^{3}(b'_{-1,i} - g'_{-1,i}) + \sum_{j=0}^{3}(b'_{j,-1} - g'_{j,-1})}{8} \quad (9)$$

Alternatively, a and b of Equation 1 may be determined to be values that minimize a sum of differences ($r_B$) between the original pixel values $b_{i,j}$ in a 4×4 B color component pixel block, and prediction pixel values of the 4×4 B color component pixel block. Otherwise, a may be set to 1, and b may be determined to be the average of differences between the original pixel values $b_{i,j}$ in a 4×4 B color component pixel block, and pixel values $G'_{i,j}$ of a reconstructed 4×4 G color component pixel block as follows:

$$b = \frac{\sum_{i=0}^{3} \sum_{j=0}^{3}(b_{i,j} - g'_{i,j})}{8} \quad (10)$$

As mentioned above, the second prediction pixel block of the B color component pixel block may be a 16×16 block, an 8×8 block, or a 4×4 block. As an adaptive example, correlation prediction for each macroblock may be performed in units of a block among the three block modes.

The subtraction unit 307 calculates a difference between the original B color component pixel block and a prediction pixel block predicted by the second prediction pixel block generation unit 314b in order to generate a second residue, and the generated second residue passes through transformation, quantization, and entropy-encoding and is output as a bitstream.

Next, like the pixel values of the B color component pixel block, pixel values of the R color component pixel block can also be predicted using pixel values of a reconstructed G color component pixel block.

The second prediction pixel block candidate generation unit 314b may predict pixel values of the R color component pixel block using pixel values of a reconstructed B color component image that is previously processed, instead of a reconstructed G color component pixel block. In other words, the transformed and quantized value of the second residue that is a difference between the original B color component pixel block and the prediction pixel block thereof is inversely transformed and inversely quantized, and the B color component pixel block reconstructed by adding the inversely transformed and inversely quantized second residue to the prediction pixel block of the B color component pixel block may be used for prediction of the R color component pixel block.

More specifically, when a pixel value of a pixel in an $i^{th}$ row and a $j^{th}$ column of a reconstructed B color component pixel block is $b'_{ij}$, a prediction value of a pixel in an $i^{th}$ row and a $j^{th}$ column of an R color component pixel block corresponding to $b'_{ij}$ is $\overline{r}_{ij}$, and a predetermined weight indicating correlation between the B color component image and the R color component image is c, and a predetermined offset value is d, the second prediction pixel block candidate generation unit 314b models correlation between the pixel values of the reconstructed B color component pixel block and the R color component pixel block as a first-order function as follows, thereby predicting pixel values of the R color component image corresponding to pixel values of the B color component image.

$$\overline{r}_{ij} = c \times b'_{ij} + d \qquad (11)$$

When prediction pixel values obtained using Equation 11 are clipped to integers between 0 and 255 when a pixel value of an image is expressed with 8 bits. c and d may be determined in the similar manner to determination of a and b.

Once the constant values c and d of Equation 11 are determined, the second prediction pixel block candidate generation unit 314b substitutes pixel values $b'_{ij}$ of the reconstructed B color component pixel block into Equation 11 to predict corresponding pixel values of the R color component pixel block, thereby generating a second prediction pixel block candidate for the R color component pixel block.

Figure 9:
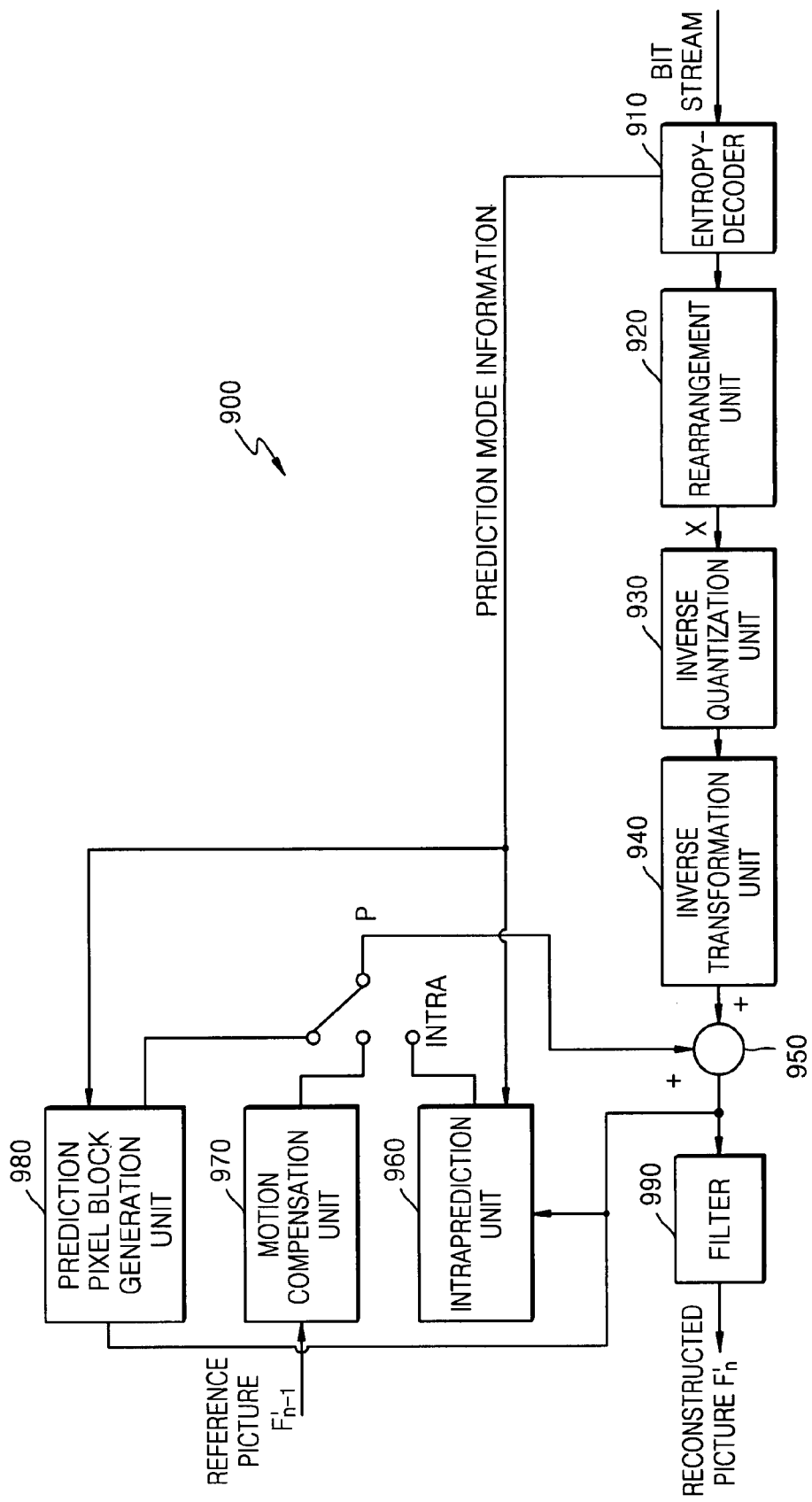
FIG. 9 is a block diagram of an image decoder according to an exemplary embodiment of the present invention.

FIG. 9 is a block diagram of an image decoder 900 according to an exemplary embodiment of the present invention.

Referring to FIG. 9, the image decoder 900 includes an entropy-decoding unit 910, a rearrangement unit 920, an inverse quantization unit 930, an inverse transformation unit 940, an addition unit 950, an intraprediction unit 960, a motion compensation unit 970, a prediction pixel block generation unit 980, and a filter 990.

The entropy-decoding unit 910 and the rearrangement unit 920 receive a compressed bitstream and perform entropy-decoding on the bitstream, thereby generating quantized coefficients. The inverse quantization unit 930 and the inverse transformation unit 940 perform inverse quantization and inverse transformation on the quantized coefficients in order to extract residue information, motion vector information, and prediction mode information for each color component image. Here, the prediction mode information may include a predetermined syntax indicating whether the compressed bitstream is a bitstream encoded by intraprediction according to the present invention. If the compressed bitstream is encoded by intraperdiction according to an exemplary embodiment of the present invention, the prediction mode information may include predictor information used for prediction of pixel values of the other color component pixel blocks.

If the current pixel block is an intrapredicted pixel block, the intraprediction unit 960 generates a prediction pixel block of the current pixel block using a previously decoded neighbor pixel block. If the current pixel block is an interpredicted pixel block, the motion compensation unit 970 generates a prediction pixel block of the current pixel block by motion compensation.

If the received bitstream is encoded by an image encoding method according to an exemplary embodiment of the present invention, the prediction pixel block generation unit 980 performs motion estimation on the other color component pixel block(s) using a motion vector of the decoded first color component pixel block or performs prediction using a decoded first color component pixel block, thereby generating a prediction pixel block(s) of the other color component pixel block(s).

More specifically, like the prediction pixel block generation unit 314 of FIG. 3, the prediction pixel block generation unit 980 determines the same motion vector as the motion vector of the first color component pixel block to be a motion vector of the other color component pixel block(s) according to prediction mode information included in the bitstream. Then, the prediction pixel block generation unit 980 determines a pixel block of a reference frame indicated by the determined motion vector of the other color component pixel block(s) to be a prediction pixel block. The prediction pixel block generation unit 980 also substitutes pixel values of the decoded first color component pixel block into Equation 1, thereby predicting pixel values of the other color component pixel block(s). If a and b are predicted using a neighbor pixel block, they are not needed to be included in the bitstream. In other words, in this case, a and b are not included in the prediction mode information. If the third color component image is predicted using the reconstructed second color component image, a prediction pixel block of the third color component pixel block may be generated by substituting pixel values of the reconstructed second color component pixel block into Equation 11 according to the prediction mode information.

The addition unit 950 adds a prediction pixel block generated by one of the intraperdiction unit 960, the motion compensation unit 970, and the prediction pixel block generation unit 980 according to the prediction mode of the current pixel block, and a residue for each color component pixel block output from the inverse transformation unit 940 in order to decode each color component pixel block.

Figure 10:
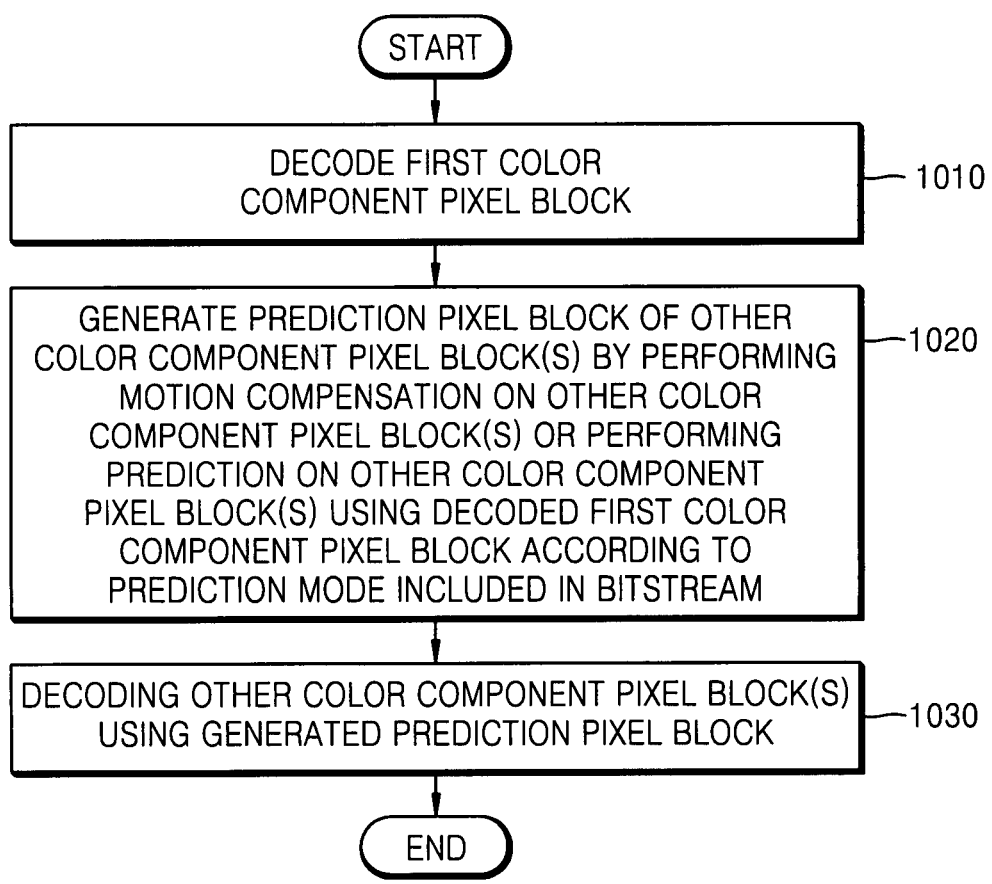
FIG. 10 is a flowchart illustrating an image decoding method according to an exemplary embodiment of the present invention.

FIG. 10 is a flowchart illustrating an image decoding method according to an exemplary embodiment of the present invention.

Referring to FIG. 10, a bitstream including at least two encoded color component images is received in operation 1010. Decoding is performed on a first color component image among a plurality of color component images included in the bitstream. More specifically, a prediction pixel block of an interpredicted or intrapredicted first color component pixel block, and a decoded first residue are added, thereby decoding a first color component pixel block.

In operation 1020, pixel values of the other color component pixel block(s) are predicted using the decoded first color component pixel block and prediction mode information included in a header of the bitstream. As mentioned above, the generates a predictor like in Equation 1 using the prediction mode information, and substitutes pixel values of a decoded first color component pixel block into Equation 1 in order to predict pixel values of a second color component pixel block and a third color component pixel block. Otherwise, the prediction pixel block generation unit 980 may generate a predictor like in Equation 11, and substitutes pixel values of a decoded second color component pixel block into Equation 11 in order to predict pixel values of the third color component pixel block. Alternatively, according to a prediction mode, prediction pixel blocks may be generated by motion compensation of the second color component pixel block and the third color component pixel block.

In operation 1030, an inversely transformed second residue and an inversely transformed third residue are added to the prediction pixel blocks of the second color component pixel block and the third color component pixel block, thereby decoding the second color component pixel block and the third color component pixel block.

The present invention can also be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over a network of coupled computer systems so that the computer-readable code is stored and executed in a decentralized fashion.

As described above, according to the exemplary embodiments of the present invention, predictive encoding is performed using correlation among a plurality of color component images forming a single image, thereby improving encoding efficiency.

Moreover, according to the exemplary embodiments of the present invention, encoding is performed on an RGB input image in an RGB domain without transformation into a YUV domain, thereby preventing color distortion during transformation of the RGB image into another color format and thus improving display quality.

While the present invention has been particularly shown and described with reference to the exemplary embodiments thereof, it will be understood by those of ordinary skill in the art that various changes in form and details may be made therein without departing from the spirit and scope of the present invention as defined by the following claims.

What is claimed is:

1. An image encoding method comprising operations of:
    performing predictive-encoding on a first color component pixel block of a first color component image of an input image;
    performing motion estimation on at least one of other color component pixel blocks corresponding to the first color component pixel block in order to generate a first prediction pixel block candidate for the at least one of the other color component pixel block(s);
    reconstructing the predictive-encoded first color component pixel block;
    predicting the at least one of the other color component pixel blocks using the reconstructed first color component pixel block in order to generate a second prediction pixel block candidate for the at least one of the other color component pixel blocks; and
    determining one of the first prediction pixel block candidate and the second prediction pixel block candidate to be a prediction pixel block of the at least one of the other color component pixel blocks.

2. The image encoding method of claim 1, wherein the input image comprises a red (R) color component image, a green (G) color component image, and a blue (B) color component image.

3. The image encoding method of claim 1, wherein the performing predictive-encoding on a first color component pixel block of predetermined size of a first color component image comprises:
    performing at least one of motion estimation and intraprediction on the first color component pixel block in order to generate a prediction pixel block of the first color component pixel block;
    generating a first residue that is a difference between the generated prediction pixel block of the first color component pixel block and the first color component pixel block; and
    performing transformation, quantization, and entropy-encoding on the first residue.

4. The image encoding method of claim 1, wherein the performing motion estimation on at least one of other color component pixel blocks comprises:
    determining a motion vector of the first color component pixel block generated by motion estimation performed during predictive-encoding of the first color component pixel block to be a motion vector of the at least one of the other color component pixel blocks; and
    determining a pixel block of a reference frame indicated by the determined motion vector to be the first prediction pixel block candidate of the at least one of the other color component pixel blocks.

5. The image encoding method of claim 3, wherein the reconstructing the predictive-encoded first color component pixel block comprises:
    inversely quantizing and inversely transforming the first residue; and
    adding the inversely quantized and inversely transformed first residue, and the prediction pixel block of the first color component pixel block in order to reconstruct the first color component pixel block.

6. The image encoding method of claim 1 wherein the predicting the at least one of the other color component pixel blocks using the reconstructed first color component pixel block comprises generating a second prediction pixel block candidate for a second color component pixel block, among the at least one of the other color component pixel blocks, using $\overline{Y_{ij}} = a \times X'_{ij} + b$,
    where a size of the reconstructed first color component pixel block is i×j (i and j are integers), a reconstructed pixel value in an $i^{th}$ row and a $j^{th}$ column of the reconstructed first color component pixel block is $X'_{ij}$, a prediction pixel value of the second prediction pixel block candidate for the second color component pixel block corresponding to $X'_{ij}$ is $\overline{Y_{ij}}$, a predetermined weight is a, and a predetermined offset value is b.

7. The image encoding method of claim 6, wherein a and b are determined to be values that minimize differences between prediction pixel values of a neighbor pixel block of the second color component pixel block predicted using pixel values of a reconstructed neighbor pixel block of the first color component pixel block, and pixel values of a reconstructed neighbor pixel block of the second color component pixel block.

8. The image encoding method of claim 6, wherein a is 1, and b is an average of differences between the pixel values of the reconstructed neighbor pixel block of the second color component pixel block, and the pixel values of the reconstructed neighbor pixel block of the first color component pixel block.

9. The image encoding method of claim 6, wherein a and b are determined to be values that minimize a sum of differences between absolute values of original pixel values $Y_{ij}$ of the second color component pixel block, and prediction pixel values $\overline{Y_{ij}}$ of the second prediction pixel block candidate for the second color component pixel block.

10. The image encoding method of claim 6, wherein a is 1, and b is an average of differences between original pixel values $Y_{ij}$ of the second color component pixel block and the pixel values $X'_{ij}$ of the reconstructed first color component pixel block.

11. The image encoding method of claim 6, wherein a and b are determined based on a linear regression model.

12. The image encoding method of claim 6, wherein the predicting the at least one of the other color component pixel blocks using the reconstructed first color component pixel block comprises generating the second prediction pixel block candidate for the second color component pixel block using the reconstructed first color component pixel block, and generating the second prediction pixel block candidate for the third color component pixel block using the reconstructed second color component pixel block.

13. The image encoding method of claim 12, wherein the predicting the at least one of the other color component pixel blocks using the reconstructed first color component pixel block comprises generating the second prediction pixel block candidate for a third color component pixel block, among the at least one of the other color component pixel blocks, using $\overline{Z_{ij}}=c \times Y'_{ij}+d$, where a size of the reconstructed second color component pixel block is i×j (i and j are integers), a reconstructed pixel value in an $i^{th}$ row and a $j^{th}$ column of the reconstructed second color component pixel block is $Y'_{ij}$, a prediction pixel value of the second prediction pixel block candidate for the third color component pixel block corresponding to $Y'_{ij}$ is $\overline{Z_{ij}}$, a predetermined weight is c, and a predetermined offset value is d.

14. The image encoding method of claim 13, wherein c and d are determined to be values that minimize differences between prediction pixel values of a neighbor pixel block of the third color component pixel block predicted using pixel values of a reconstructed neighbor pixel block of the second color component pixel block, and pixel values of a reconstructed neighbor pixel block of the third color component pixel block.

15. The image encoding method of claim 13, wherein c is 1, and d is an average of differences between pixel values of a reconstructed neighbor pixel block of the third color component pixel block, and pixel values of a reconstructed neighbor pixel block of the second color component pixel block.

16. The image encoding method of claim 13, wherein c and d are determined to be values that minimize a sum of differences between absolute values of original pixel values $Z_{ij}$ of the third color component pixel block, and prediction pixel values $\overline{Z_{ij}}$ of the second prediction pixel block candidate for the third color component pixel block.

17. The image encoding method of claim 13, wherein c is 1, and d is an average of differences between original pixel values $Z_{ij}$ of the third color component pixel block, and pixel values $Y'_{ij}$ of the reconstructed second color component pixel block.

18. An image encoder comprising:
a first prediction pixel block candidate generation unit which performs motion estimation on at least one of other color component pixel blocks corresponding to a first color component pixel block of a previously predictive-encoded first color component image of an input image in order to generate a first prediction pixel block candidate;
a reconstruction unit which reconstructs the predictive-encoded first color component pixel block;
a second prediction pixel block candidate generation unit which predicts the at least one of the other color component pixel blocks using the reconstructed first color component pixel block in order to generate a second prediction pixel block candidate for the at least one of the other color component pixel blocks; and
a determination unit which determines one of the first prediction pixel block candidate and the second prediction pixel block candidate to be a prediction pixel block of the at least one of the other color component pixel blocks,
wherein the first prediction pixel block candidate generation unit is implemented as hardware.

19. The image encoder of claim 18, wherein the input image comprises a red (R) color component image, a green (G) color component image, and a blue (B) color component image.

20. The image encoder of claim 18, wherein the first prediction pixel block candidate generation unit determines a motion vector of the first color component pixel block generated by motion estimation performed during predictive-encoding of the first color component pixel block, to be a motion vector of the at least one of the other color component pixel blocks, and determines a pixel block of a reference frame indicated by the determined motion vector to be the first prediction pixel block candidate of the at least one of the other color component pixel blocks.

21. The image encoder of claim 18, wherein the second prediction pixel block candidate generation unit generates a second prediction pixel block candidate for a second color component pixel block, among the at least one of the other color component pixel blocks, using $\overline{Y_{ij}}=a \times X'_{ij}+b$, where a size of the reconstructed first color component pixel block is i×j (i and j are integers), a reconstructed pixel value in an $i^{th}$ row and a $j^{th}$ column of the reconstructed first color component pixel block is $X'_{ij}$, a prediction pixel value of the second prediction pixel block candidate for the second color component pixel block corresponding to $X'_{ij}$ is $\overline{Y_{ij}}$, a predetermined weight is a, and a predetermined offset value is b.

22. The image encoder of claim 21, wherein a and b are determined to be values that minimize differences between prediction pixel values of a neighbor pixel block of the second color component pixel block predicted using pixel values of a reconstructed neighbor pixel block of the first color component pixel block, and pixel values of a reconstructed neighbor pixel block of the second color component pixel block.

23. The image encoder of claim 21, wherein a is 1, and b is an average of differences between the pixel values of the reconstructed neighbor pixel block of the second color component pixel block, and the pixel values of the reconstructed neighbor pixel block of the first color component pixel block.

24. The image encoder of claim 21, wherein a and b are determined to be values that minimize a sum of differences between absolute values of original pixel values $Y_{ij}$ of the second color component pixel block, and prediction pixel values $\overline{Y_{ij}}$ of the second prediction pixel block candidate for the second color component pixel block.

25. The image encoder of claim 21, wherein a is 1, and b is an average of differences between original pixel values $Y_{ij}$ of the second color component pixel block, and pixel values $X'_{ij}$ of the reconstructed first color component pixel block.

26. The image encoder of claim 21, wherein a and b are determined based on a linear regression model.

27. The image encoder of claim 21, wherein the second prediction pixel block candidate generation unit generates the second prediction pixel block candidate for the second color component pixel block using the reconstructed first color component pixel block, and generates the second prediction pixel block candidate for the third color component pixel block using the reconstructed second color component pixel block.

28. The image encoder of claim 27, wherein the second prediction pixel block candidate generation unit generates the second prediction pixel block candidate for a third color component pixel block, among the at least one of the other color component pixel blocks, using $\overline{Z_{ij}} = c \times Y'_{ij} + d$, where a size of the reconstructed second color component pixel block is i×j (i and j are integers), a reconstructed pixel value in an $i^{th}$ row and a $j^{th}$ column of the reconstructed second color component pixel block is $Y'_{ij}$, a prediction pixel value of the second prediction pixel block candidate for the third color component pixel block corresponding to $Y'_{ij}$ is $\overline{Z_{ij}}$, a predetermined weight is c, and a predetermined offset value is d.

29. The image encoder of claim 28, wherein c and d are determined to be values that minimize differences between prediction pixel values of a neighbor pixel block of the third color component pixel block predicted using pixel values of a reconstructed neighbor pixel block of the second color component pixel block, and pixel values of a reconstructed neighbor pixel block of the third color component pixel block.

30. The image encoder of claim 28, wherein c is 1, and d is an average of differences between pixel values of a reconstructed neighbor pixel block of the third color component pixel block, and pixel values of a reconstructed neighbor pixel block of the second color component pixel block.

31. The image encoder of claim 28, wherein c and d are determined to be values that minimize a sum of differences between absolute values of the original pixel values $Z_{ij}$ of the third color component pixel block, and prediction pixel values $\overline{Z_{ij}}$ of the second prediction pixel block candidate for the third color component pixel block.

32. The image encoder of claim 28, wherein c is 1, and d is an average of differences between original pixel values $Z_{ij}$ of the third color component pixel block, and pixel values $Y'_{ij}$ of the reconstructed second color component pixel block.

33. An image decoding method comprising:
    decoding a first color component pixel block of a first color component image included in an input bitstream;
    generating a prediction pixel block of at least one of the other color component pixel blocks by performing at least one of motion compensation on the at least one of the other color component pixel blocks corresponding to the first color component pixel block, and prediction using the decoded first color component pixel block according to prediction mode information included in the bitstream; and
    decoding the at least one of the other color component pixel blocks using the generated prediction pixel block of the at least one of the other color component pixel blocks.

34. The image decoding method of claim 33, wherein the color components are a red (R) color component, a green (G) color component, and a blue (B) color component.

35. The image decoding method of claim 33, wherein the decoding a first color component pixel block of a first color component image comprises:
    decoding a first residue of the first color component pixel block;
    generating a prediction pixel block of the first color component pixel block by performing at least one of intra-prediction and motion compensation according to a prediction mode of the first color component pixel block; and
    decoding the first color component pixel block by adding the decoded first residue to the prediction pixel block of the first color component pixel block.

36. The image decoding method of claim 33, wherein the generating a prediction pixel block of at least one of the other color component pixel blocks comprises:
    during motion compensation of the at least one of the other color component pixel blocks;
    determining a motion vector of the first color component pixel block to be a motion vector of the at least one of the other color component pixel blocks; and
    determining a pixel block of a reference frame indicated by the determined motion vector to be the first prediction pixel block candidate of the at least one of the other color component pixel blocks.

37. The image decoding method of claim 33, wherein the generating a prediction pixel block of at least one of the other color component pixel blocks comprises generating a prediction pixel block of a second color component pixel block, among the at least one of the other color component pixel blocks, using $\overline{Y_{ij}} = a \times X'_{ij} + b$, where a size of the decoded first color component pixel block is i×j (i and j are integers), a decoded pixel value in an $i^{th}$ row and a $j^{th}$ column of the decoded first color component pixel block is $X'_{ij}$, a prediction pixel value of the second prediction pixel block of the second color component pixel block corresponding to $X'_{ij}$ is $\overline{Y_{ij}}$, a predetermined weight is a, and a predetermined offset value is b.

38. The image decoding method of claim 37, wherein a and b are transmitted as being inserted into the bitstream during encoding.

39. The image decoding method of claim 33, wherein the generating a prediction pixel block of at least one of the other color component pixel blocks comprises:
    generating a prediction pixel block of a second color component pixel block, among the at least one of the other color component pixel blocks, using the decoded first color component pixel block;
    decoding the second color component pixel block using the prediction pixel block of the second color component pixel block; and
    generating a prediction pixel block of a third color component pixel block, among the at least one of the other color component pixel blocks, using the decoded second color component pixel block.

40. The image decoding method of claim 39, wherein the generating a prediction pixel block of at least one of the other color component pixel blocks comprises generating a prediction pixel block of the third color component image using $\overline{Z_{ij}} = c \times Y'_{ij} + d$, where a size of the decoded second color component pixel block is i×j (i and j are integers), a decoded pixel value in an $i^{th}$ row and a $j^{th}$ column of the decoded second color component pixel block is $Y'_{ij}$, a prediction pixel value of a prediction pixel block of the third color component pixel block corresponding to $Y'_{ij}$ is $\overline{Z_{ij}}$, a predetermined weight is c, and a predetermined offset value is d.

41. The image decoding method of claim 40, wherein c and d are transmitted as being inserted into the bitstream during encoding.

42. The image decoding method of claim 33, wherein the decoding the at least one of the other color component pixel blocks using the generated prediction pixel block of the at least one of the other color component pixel blocks comprises decoding the at least one of the other color component pixel blocks by adding a residue of the at least one of the other color component pixel blocks included in the bitstream to the prediction pixel block of the at least one of the other color component pixel blocks.

43. An image decoder comprising:
a first decoding unit which decodes a first color component pixel block of a first color component image included in an input bitstream;
a prediction pixel block generation unit which generates a prediction pixel block of at least one of other color component pixel blocks, by performing at least one of motion compensation on the at least one of the other color component pixel blocks corresponding to the first color component pixel block, and prediction using the decoded first color component pixel block according to prediction mode information included in the bitstream; and
a second decoding unit which decodes the at least one of the other color component pixel blocks using the generated prediction pixel block of the at least one of the other color component pixel blocks,
wherein the prediction pixel block generation unit is implemented as hardware.

44. The image decoder of claim 43, wherein the color components are a red (R) color component, a green (G) color component, and a blue (B) color component.

45. The image decoder of claim 43, wherein the first decoding unit decodes a first residue of the first color component pixel block, generates a prediction pixel block of the first color component pixel block by performing at least one of intraprediction and motion compensation according to a prediction mode of the first color component pixel block, and decodes the first color component pixel block by adding the decoded first residue to the prediction pixel block of the first color component pixel block.

46. The image decoder of claim 43, wherein the prediction pixel block generation unit, during motion compensation of the at least one of the other color component pixel blocks, determines a motion vector of the first color component pixel block to be a motion vector of the at least one of the other color component pixel blocks, and determines a pixel block of a reference frame indicated by the determined motion vector to be the first prediction pixel block candidate of the at least one of the other color component pixel blocks.

47. The image decoder of claim 43, wherein the prediction pixel block generation unit generates a prediction pixel block of a second color component pixel block, among the at least one of the other color component pixel blocks using $\overline{Y_{ij}} = a \times X'_{ij} + b$,
where a size of the decoded first color component pixel block is i×j (i and j are integers), a decoded pixel value in an $i^{th}$ row and a $j^{th}$ column of the decoded first color component pixel block is $X'_{ij}$, a prediction pixel value of the second prediction pixel block of the second color component pixel block corresponding to $X'_{ij}$ is $\overline{Y_{ij}}$, a predetermined weight is a, and a predetermined offset value is b.

48. The image decoder of claim 47, wherein a and b are transmitted as being inserted into the bitstream during encoding.

49. The image decoder of claim 43,
wherein the prediction pixel block generation unit generates a prediction pixel block of a second color component pixel block, among the at least one of the other color component pixel blocks, using the decoded first color component pixel block, and generates a prediction pixel block of a third color component pixel block, among at least one of the other color component pixel blocks using a decoded second color component pixel block, and
wherein the decoded second color component pixel block is generated by the second decoding unit using the prediction pixel block of the second color component pixel block.

50. The image decoder of claim 49, wherein the prediction pixel block generation unit generates a prediction pixel block of the third color component image using $\overline{Z_{ij}} = c \times Y'_{ij} + d$,
where a size of the decoded second color component pixel block is i×j (i and j are integers), a decoded pixel value in an $i^{th}$ row and a $j^{th}$ column of the decoded second color component pixel block is $Y'_{ij}$, a prediction pixel value of a prediction pixel block of the third color component pixel block corresponding to $Y'_{ij}$ is $\overline{Z_{ij}}$, a predetermined weight is c, and a predetermined offset value is d.

51. The image decoder of claim 50, wherein c and d are transmitted as being inserted into the bitstream during encoding.

52. The image decoder of claim 43, wherein the second decoding unit decodes the at least one of the other color component pixel blocks by adding a residue of the at least one of the other color component pixel blocks included in the bitstream to the prediction pixel block of the at least one of the other color component pixel blocks.

* * * * *